(12) United States Patent
Wang

(10) Patent No.: US 11,460,736 B2
(45) Date of Patent: Oct. 4, 2022

(54) LIQUID CRYSTAL LENS AND METHOD FOR CONTROLLING THE SAME, AND LIQUID CRYSTAL GLASSES

(71) Applicant: BOE TECHNOLOGY GROUP CO., LTD., Beijing (CN)

(72) Inventor: Haiyan Wang, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 22 days.

(21) Appl. No.: 16/973,526

(22) PCT Filed: Oct. 25, 2019

(86) PCT No.: PCT/CN2019/113311
§ 371 (c)(1),
(2) Date: Dec. 9, 2020

(87) PCT Pub. No.: WO2021/077409
PCT Pub. Date: Apr. 29, 2021

(65) Prior Publication Data
US 2021/0373390 A1   Dec. 2, 2021

(51) Int. Cl.
*G02F 1/133*     (2006.01)
*G02F 1/1343*    (2006.01)
(Continued)

(52) U.S. Cl.
CPC .... *G02F 1/134309* (2013.01); *G02F 1/13306* (2013.01); *G02F 1/13452* (2013.01); *G02F 1/133345* (2013.01)

(58) Field of Classification Search
CPC ........ G02F 1/13; G02F 1/133; G02F 1/13306; G02F 1/1333; G02F 1/133345;
(Continued)

(56) References Cited

U.S. PATENT DOCUMENTS

2009/0153754 A1   6/2009  Jung
2010/0245743 A1   9/2010  Yokoyama
(Continued)

FOREIGN PATENT DOCUMENTS

CN         103760712 A     4/2014

OTHER PUBLICATIONS

PCT International Search Report (w/ English translation) for corresponding PCT Application No. PCT/CN2019/113311, dated Jun. 23, 2020, 6 pages.

*Primary Examiner* — Thoi V Duong
(74) *Attorney, Agent, or Firm* — Dority & Manning, P.A.

(57) ABSTRACT

A liquid crystal lens has at least two driving regions, and the liquid crystal lens includes a first electrode layer and a second electrode layer. The first electrode layer includes a plurality of first electrode groups, and each first electrode group includes a plurality of first electrodes. The plurality of first electrodes included in each first electrode group is configured to receive a plurality of first driving signals in a one-to-one correspondence manner, and each driving region in the at least two driving regions corresponds to at least one first electrode group. The second electrode layer is disposed opposite to the first electrode layer, and includes at least one second electrode configured to receive at least one second driving signal in a one-to-one correspondence manner.

20 Claims, 16 Drawing Sheets

(51) Int. Cl.
*G02F 1/1333* (2006.01)
*G02F 1/1345* (2006.01)

(58) Field of Classification Search
CPC ............. G02F 1/1343; G02F 1/134309; G02F 1/13452; G02F 1/294
See application file for complete search history.

(56) References Cited

U.S. PATENT DOCUMENTS

| | | |
|---|---|---|
| 2012/0314143 A1 | 12/2012 | Shin et al. |
| 2013/0063691 A1 | 3/2013 | Takama et al. |
| 2015/0036084 A1 | 2/2015 | Srivastava et al. |
| 2015/0109269 A1* | 4/2015 | Sung .................. H04N 13/305 345/206 |

* cited by examiner ered to receive a plurality of first driving signals in a one-to-one correspondence manner, and each driving region corresponds to at least one first electrode group. The second electrode layer is disposed opposite to the first electrode layer, and the second electrode layer includes at least one second electrode. The at least one second electrode is configured to receive at least one second driving signal in a one-to-one correspondence manner. In a same driving region, a driving voltage formed between each first driving signal received by at least one first electrode at a same position in the at least one first electrode group and at least one second driving signal received by at least one second electrode corresponding thereto is equal or approximately equal. In different driving regions, a driving voltage formed between each first driving signal received by at least one first electrode at a same position in the at least one first electrode group and at least one second driving signal received by at least one second electrode corresponding thereto in one driving region is different from a driving voltage formed between each first driving signal received by at least one first electrode at the same position in the at least one first electrode group and at least one second driving signal received by at least one second electrode corresponding thereto in another driving region, and absolute values of driving voltages progressively increase in a radial direction of the liquid crystal lens and in a direction from a center to an edge of the liquid crystal lens.

LIQUID CRYSTAL LENS AND METHOD FOR CONTROLLING THE SAME, AND LIQUID CRYSTAL GLASSES

CROSS-REFERENCE TO RELATED APPLICATION

This application is a national phase entry under 35 USC 371 of International Patent Application No. PCT/CN2019/113311 filed on Oct. 25, 2019, which is incorporated herein by reference in its entirety.

TECHNICAL FIELD

The present disclosure relates to the field of liquid crystal optical technologies, and in particular, to a liquid crystal lens and a method of controlling the same, liquid crystal glasses, and a non-transitory computer-readable storage medium.

BACKGROUND

A liquid crystal lens can be applied to situations such as three-dimensional display and image processing due to its advantages of tunability, low power consumption, light structure, etc.

SUMMARY

In one aspect, a liquid crystal lens is provided, and the liquid crystal lens has at least two driving regions. The liquid crystal lens includes: a first electrode layer and a second electrode layer. The first electrode layer includes a plurality of first electrode groups, and each first electrode group includes a plurality of first electrodes. The plurality of first electrodes included in each first electrode group are configured to receive a plurality of first driving signals in a one-to-one correspondence manner, and each driving region corresponds to at least one first electrode group. The second electrode layer is disposed opposite to the first electrode layer, and the second electrode layer includes at least one second electrode. The at least one second electrode is configured to receive at least one second driving signal in a one-to-one correspondence manner. In a same driving region, a driving voltage formed between each first driving signal received by at least one first electrode at a same position in the at least one first electrode group and at least one second driving signal received by at least one second electrode corresponding thereto is equal or approximately equal. In different driving regions, a driving voltage formed between each first driving signal received by at least one first electrode at a same position in the at least one first electrode group and at least one second driving signal received by at least one second electrode corresponding thereto in one driving region is different from a driving voltage formed between each first driving signal received by at least one first electrode at the same position in the at least one first electrode group and at least one second driving signal received by at least one second electrode corresponding thereto in another driving region, and absolute values of driving voltages progressively increase in a radial direction of the liquid crystal lens and in a direction from a center to an edge of the liquid crystal lens.

In some embodiments, the liquid crystal lens further includes: a plurality of first signal line groups in one-to-one correspondence with the plurality of first electrode groups and at least one second signal line electrically connected to the at least one second electrode in a one-to-one correspondence manner. Each first signal line group includes a plurality of first signal lines, the plurality of first signal lines included in each first signal line group are electrically connected to the plurality of first electrodes included in a corresponding first electrode group in a one-to-one correspondence manner, and each first signal line is configured to transmit a first driving signal to a first electrode electrically connected thereto. Each second signal line is configured to transmit a second driving signal to a second electrode electrically connected thereto.

In some embodiments, the liquid crystal lens further includes at least two first signal receiving terminal groups in one-to-one correspondence with the at least two driving regions. Each first signal receiving terminal group includes a plurality of first signal receiving terminals. In each driving region, the plurality of first signal lines included in each first signal line group are correspondingly electrically connected to the plurality of first signal receiving terminals included in a corresponding first signal receiving terminal group, respectively, and at least one first signal line electrically connected to the at least one first electrode at the same position in the at least one first electrode group is electrically connected to a same first signal receiving terminal.

In some embodiments, the liquid crystal lens further includes at least two first connecting line groups in one-to-one correspondence with the at least two first signal receiving terminal groups. Each first connecting line group includes a plurality of first connecting lines. In each driving region, the plurality of first signal lines included in each first signal line group are electrically connected to the plurality of first signal receiving terminals included in a corresponding first signal receiving terminal group through the plurality of first connecting lines included in a corresponding first connecting line group, respectively, and the at least one first signal line electrically connected to the at least one first electrode at the same position in the at least one first electrode group is electrically connected to the same first signal receiving terminal through a same first connecting line.

In some embodiments, the liquid crystal lens further includes at least one second signal receiving terminal electrically connected to the at least one second signal line in a one-to-one correspondence manner.

In some embodiments, the liquid crystal lens further includes at least one second connecting line electrically connected to the at least one second signal receiving terminal in a one-to-one correspondence manner. Each second signal line is electrically connected to a corresponding second signal receiving terminal through one second connecting line.

In some embodiments, the at least two driving regions include a non-compensation driving region and at least one compensation driving region, and the at least one compensation driving region is sequentially arranged around the non-compensation driving region in the radial direction of the liquid crystal lens and in the direction from a center to an edge of the liquid crystal lens. A width of each first electrode included in each first electrode group in the compensation driving region is less than a preset dimension, and a width of each first electrode included in each first electrode group in the non-compensation driving region is greater than or equal to the preset dimension. The preset dimension is related to a width of a first electrode corresponding to a maximum critical value of an interference electric field within an acceptable range.

In some embodiments, the preset dimension is 10.3 µm.

In some embodiments, the liquid crystal lens further includes a first insulating layer. The first electrode layer includes a first sub-electrode layer and a second sub-electrode layer that are disposed in a stack, and the first insulating layer is located between the first sub-electrode layer and the second sub-electrode layer. In a plurality of first electrodes included in the plurality of first electrode groups, a part of all first electrodes are disposed in the first sub-electrode layer, and another part of all first electrodes are disposed in the second sub-electrode layer.

In some embodiments, in the radial direction of the liquid crystal lens and in the direction from the center to the edge of the liquid crystal lens, the plurality of first electrodes included in the plurality of first electrode groups are alternately disposed in the first sub-electrode layer and the second sub-electrode layer.

In some embodiments, the second electrode layer includes at least two second electrodes, the at least two second electrodes are disposed in a same layer, and two adjacent second electrodes are insulated from each other by a gap therebetween. The at least two driving regions are in one-to-one correspondence with the at least two second electrodes.

In some embodiments, the liquid crystal lens further includes a second insulating layer, the second electrode layer includes a third sub-electrode layer and a fourth sub-electrode layer that are disposed in a stack, and the second insulating layer is located between the third sub-electrode layer and the fourth sub-electrode layer. The second electrode layer includes at least two second electrodes, at least one second electrode is disposed in the third sub-electrode layer, and at least one remaining second electrode is disposed in the fourth sub-electrode layer.

In some embodiments, in the radial direction of the liquid crystal lens and in the direction from the center to the edge of the liquid crystal lens, the at least two second electrodes included in the second electrode layer are alternately disposed in the third sub-electrode layer and the fourth sub-electrode layer.

In some embodiments, in the at least two second electrodes included in the second electrode layer, one second electrode is a circular electrode or a whole electrode, and at least one remaining second electrode is an annular electrode; and the circular electrode or the whole electrode is disposed in one of the third sub-electrode layer and the fourth sub-electrode layer, and the at least one annular electrode is disposed in another of the third sub-electrode layer and the fourth sub-electrode layer.

In some embodiments, the at least two driving regions include a non-compensation driving region and at least one compensation driving region, and the at least one compensation driving region is sequentially arranged around the non-compensation driving region in the radial direction of the liquid crystal lens and in the direction from a center to an edge of the liquid crystal lens; each annular electrode corresponds to one compensation driving region; and in a case where the second electrode layer includes a circular electrode, the circular electrode corresponds to the non-compensation driving region.

In some embodiments, the liquid crystal lens has 3 to 8 driving regions.

In another aspect, liquid crystal glasses are provided. The liquid crystal glasses include the liquid crystal lens as described in any of the above embodiments.

In yet another aspect, a method for controlling a liquid crystal lens is provided. The method is applied to the liquid crystal lens as described in any of the above embodiments. The method includes: transmitting first driving signals to the plurality of first electrodes of each first electrode group in the first electrode layer of the liquid crystal lens respectively, and transmitting a second driving signal to each second electrode in the second electrode layer of the liquid crystal lens, so that a driving voltage is formed between each first electrode and at least one second electrode corresponding to the first electrode In the same driving region of the liquid crystal lens, a driving voltage formed between each first driving signal received by the at least one first electrode at the same position in the at least one first electrode group and the at least one second driving signal received by the at least one second electrode corresponding thereto is equal or approximately equal. In different driving regions of the liquid crystal lens, a driving voltage formed between each first driving signal received by the at least one first electrode at the same position in the at least one first electrode group and the at least one second driving signal received by the at least one second electrode corresponding thereto in one driving region is different from a driving voltage formed between each first driving signal received by the at least one first electrode at the same position in the at least one first electrode group and the at least one second driving signal received by the at least one second electrode corresponding thereto in another driving region, and absolute values of the driving voltages increase progressively in the radial direction of the liquid crystal lens and in the direction from the center to the edge of the liquid crystal lens, so that phase differences of the liquid crystal lens in the driving regions are equal or approximately equal.

In some embodiments, the step of transmitting first driving signals to the plurality of first electrodes of each first electrode group in the first electrode layer of the liquid crystal lens respectively includes: in the same driving region, transmitting a same first driving signal to the at least one first electrode at the same position in the at least one first electrode group corresponding to the driving region; in different driving regions, transmitting different first driving signals to the first electrodes at the same position in the first electrode groups corresponding to different driving regions respectively, and voltage values of the first driving signals are increased or decreased progressively and sequentially in the radial direction of the liquid crystal lens and in the direction from the center to the edge of the liquid crystal lens. The step of transmitting a second driving signal to each second electrode in the second electrode layer of the liquid crystal lens includes: transmitting a same second driving signal to each second electrode in the second electrode layer.

In some embodiments, the second electrode layer includes at least two second electrodes in one-to-one correspondence with the at least two driving regions. The step of transmitting first driving signals to the plurality of first electrodes of each first electrode group in the first electrode layer of the liquid crystal lens respectively includes: transmitting a same first driving signal to the first electrodes at the same position in the first electrode groups in the at least two driving regions of the liquid crystal lens. The step of transmitting a second driving signal to each second electrode in the second electrode layer of the liquid crystal lens includes: transmitting different second driving signals to second electrodes corresponding to different driving regions respectively, and voltage values of the second driving signals are increased or decreased progressively and sequentially in the radial direction of the liquid crystal lens and in the direction from the center to the edge of the liquid crystal lens.

In some embodiments, the second electrode layer includes a circular electrode or a whole electrode, and at least one annular electrode. The step of transmitting first driving signals to the plurality of first electrodes of each first electrode group in the first electrode layer of the liquid crystal lens respectively includes: transmitting a same first driving signal to the first electrodes at the same position in the first electrode groups in the at least two driving regions of the liquid crystal lens. The step of transmitting a second driving signal to each second electrode in the second electrode layer of the liquid crystal lens respectively includes: transmitting different second driving signals to different annular electrodes, and voltage values of the second driving signals are increased or decreased progressively and sequentially in the radial direction of the liquid crystal lens and in the direction from the center to the edge of the liquid crystal lens.

In yet another aspect, a non-transitory computer-readable storage medium is provided, which has a computer program instruction stored therein. When the computer program instruction runs in a processor, the processor executes the method for controlling the liquid crystal lens as described in any of the above embodiments.

In yet another aspect, a computer program product is provided, and the computer program product includes a computer program instruction. When it runs in a computer, the computer executes the method for controlling the liquid crystal lens as described in any of the above embodiments.

In yet another aspect, a computer program is provided. When the computer program is loaded into a processor, the processor executes the method for controlling the liquid crystal lens as described in any of the above embodiments.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to these drawings.

DETAILED DESCRIPTION

Some embodiments of the present disclosure will be described in combination with the accompanying drawings. Obviously, the described embodiments are merely some but not all of the embodiments of the present disclosure. All other embodiments made on the basis of the embodiments of the present disclosure by a person of ordinary skill in the art shall be included in the protection scope of the present disclosure.

Terms "first", "second", "third" and "fourth" are only used for descriptive purposes and are not to be construed as indicating or implying the relative importance or implicitly indicating the number of indicated technical features. Thus, features defined as "first", "second", "third" and "fourth" may explicitly or implicitly include one or more of the features. In the description of the embodiments of the present disclosure, the term "a plurality of/the plurality of" means two or more unless otherwise specified.

A liquid crystal lens generally includes two substrates, and a liquid crystal layer sandwiched between the two substrates. Both the two substrates are provided with electrodes. By applying voltages to the electrodes on the two substrates respectively, liquid crystal molecules in the sandwiched liquid crystal layer may be driven to rotate, thereby realizing changes of transmittance and an optical path difference of light transmitted through the liquid crystal lens, so that the liquid crystal lens may simulate various optical lenses, such as a convex lens, a Fresnel lens and a concave lens.

Figure 1:
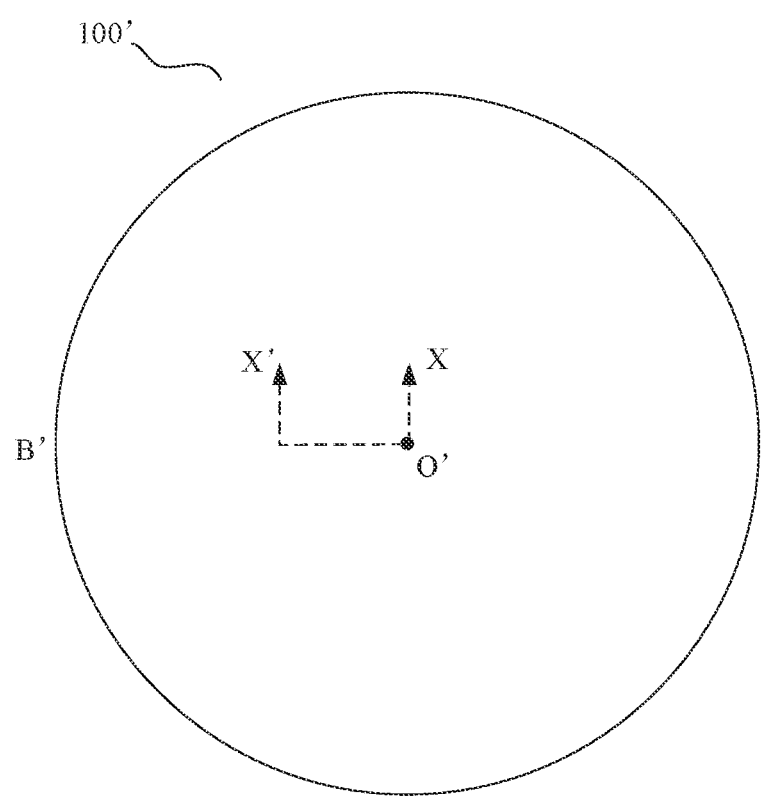
FIG. 1 is a schematic top view showing a structure of a liquid crystal lens in the related art.
Figure 2:
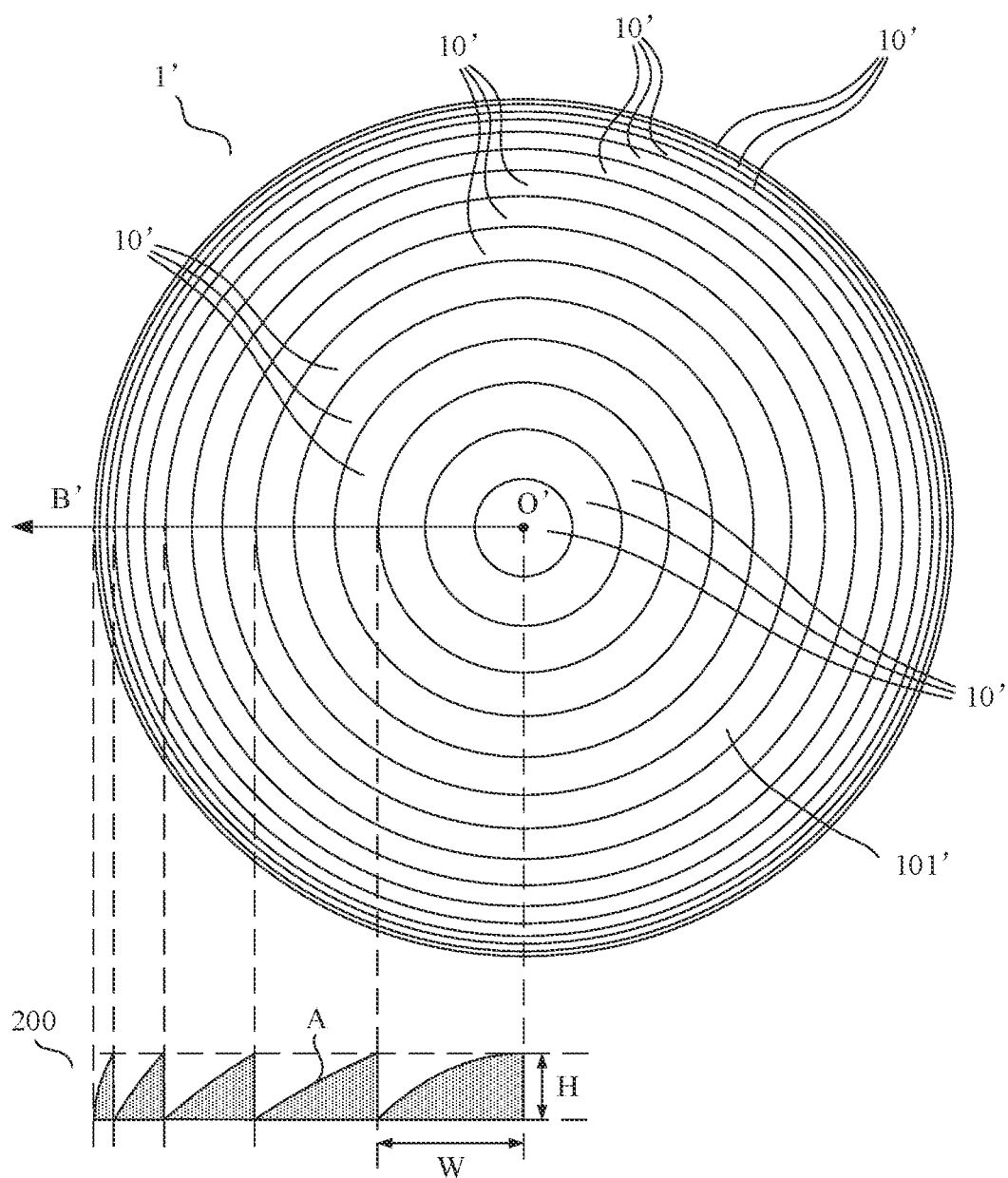
FIG. 2 is a schematic top view showing a structure of a first electrode layer of a liquid crystal lens in the related art.
Figure 3:
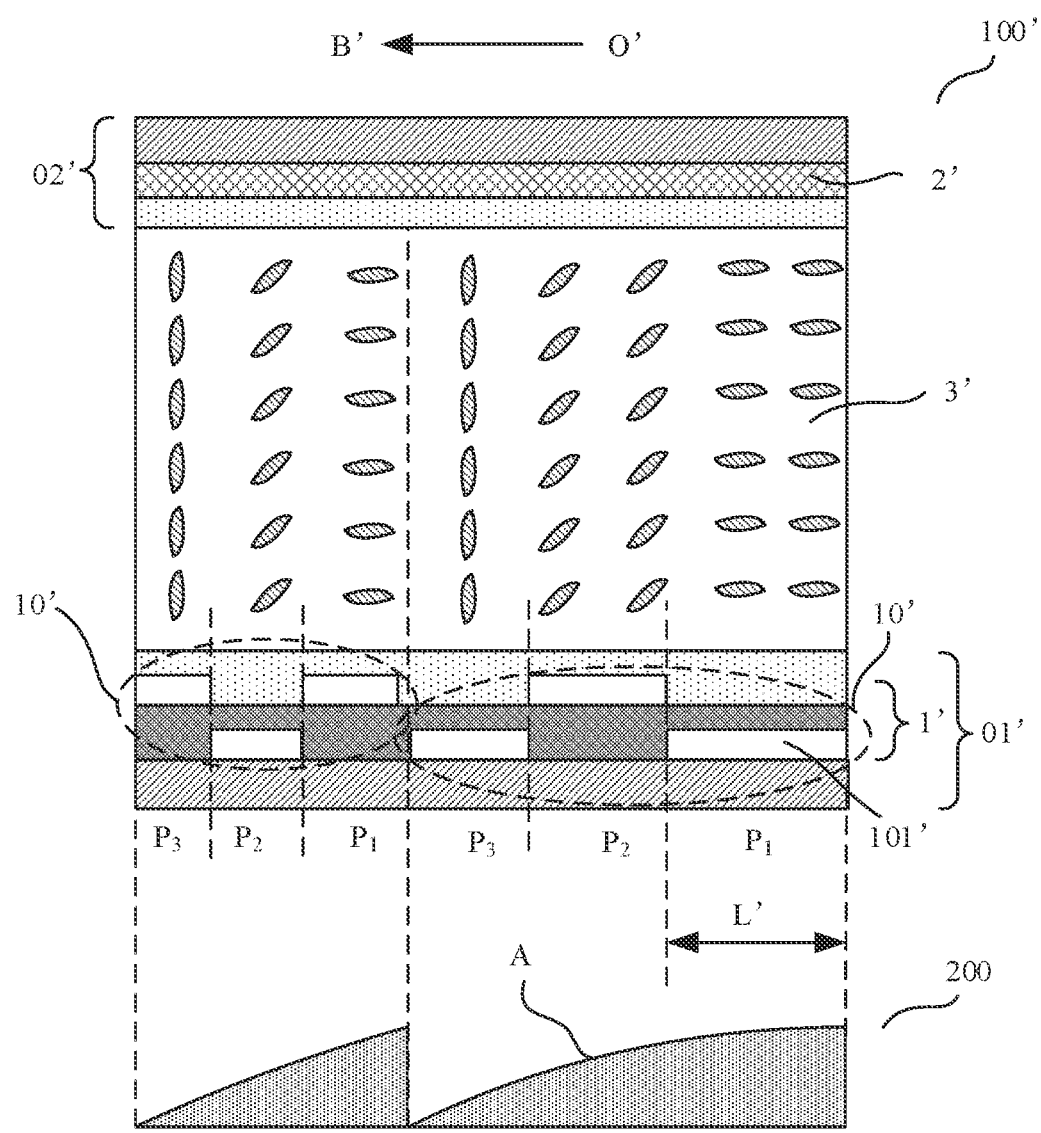
FIG. 3 is a schematic section showing a structure of a liquid crystal lens along the dashed line XX' in FIG. 1, in the related art.

Referring to FIGS. 1 to 3, in some examples, a liquid crystal lens 100' is used to simulate a Fresnel lens 200. The liquid crystal lens 100' is circular, including a first substrate 01' and a second substrate 02' that are oppositely disposed, and a liquid crystal layer 3' sandwiched therebetween. The first substrate 01' includes a first electrode layer 1'. The first electrode layer 1' includes a plurality of first electrodes 101', and a first electrode 101 at the center O' of the liquid crystal lens 100' is circular, whereas remaining first electrodes 101' are annular. The annular first electrodes 101' are sequentially arranged in a radial direction of the liquid crystal lens 100' and in a direction O'B' from the center O' to an edge of the liquid crystal lens 100'. The second substrate 02' includes a second electrode layer 2', and the second electrode layer 2' is a whole electrode.

The plurality of first electrodes 101' included in the first electrode layer 1' of the first substrate 01' are divided into first electrode groups 10', each first electrode group 10' includes a plurality of first electrodes 101', and the number of first electrodes 101' in each first electrode group 10' is the same. FIGS. 2 and 3 exemplarily shows that each first electrode group 10' includes three first electrodes 101'.

In each first electrode group 10', positions of the plurality of first electrodes 101' are respectively numbered $P_1$ to $P_N$ in the radial direction of the liquid crystal lens 100' and in the direction O'B' from the center O' to the edge B' of the liquid crystal lens 100', where N is the number of first electrodes 101' included in each first electrode group 10', and N is an integer greater than or equal to 2. For example, each first electrode group 10' in FIG. 3 includes three first electrodes 101', and in the direction O'B', positions of the three first electrodes 101' included in each first electrode group 10' are numbered $P_1$, $P_2$ and $P_3$, respectively.

In the following description, first electrodes 101' with a same position number in the first electrode groups 10' are referred to as first electrodes 101' at a same position. For example, in the two first electrode groups 10' shown in FIG. 3, the two first electrodes 101' with the position number $P_2$ (i.e., both at the position $P_2$) are the first electrodes 101' at the same position.

With continued reference to FIGS. 2 and 3, in the direction O'B', the Fresnel lens 200 to be simulated by the liquid crystal lens 100' includes a plurality of annular sawteeth A that are arranged in sequence. A height H of each sawtooth A is equal or approximately equal, and widths W of the sawteeth A decrease progressively in the direction O'B'.

Each first electrode group 10' of the first substrate 01' in the liquid crystal lens 100' is configured to simulate a sawtooth A correspondingly. A first driving voltage signal $SD_1'$ is transmitted to each first electrode 101' in each first electrode group 10', and voltage values of the first electrodes 101' in each first electrode group 10' progressively increase in the direction O'B'. For example, in each first electrode group 10', a voltage value of the first electrode 101' at the position $P_1$, a voltage value of the first electrode 101' at the position $P_2$ and a voltage value of the first electrode 101' at the position $P_3$ increase progressively. Meanwhile, a second driving voltage $SD_2'$ is transmitted to the second electrode layer 2' of the second substrate 02' in the liquid crystal lens 100'.

In this way, a driving electric field is formed between each first electrode 101' in each first electrode group 10' and the second electrode layer 2', and the liquid crystal molecules in the liquid crystal layer 3' rotate under action of the driving electric field. In a region of the liquid crystal layer 3' corresponding to each first electrode group 10', deflection angles of the liquid crystal molecules (the deflection angle is an included angle between the long axis of the liquid crystal molecule and a plane where the first substrate 01' is located) increase progressively in the direction O'B', so that refractive index coefficients decrease progressively in the direction O'B', and the simulation of optical characteristics of a sawtooth A by a corresponding first electrode group 10' is realized.

In a driving process of the liquid crystal lens 100', voltage values of the first electrodes 101' at the same position in the first electrode groups 10' are equal, so that deflection angles of the liquid crystal molecules in the regions of the liquid crystal layer 3' corresponding to the first electrodes 101' at the same position are equal or approximately equal, which makes refractive index coefficients of portions of the liquid crystal layer 3' corresponding to the first electrodes 101' at the same position equal or approximately equal. In this way, the height H of the sawtooth A simulated by each first electrode group 10' can be equal or approximately equal.

Widths L' of the first electrodes 101' in the first electrode layer 1' decrease progressively in the direction O'B', so that the portions of the liquid crystal layer 3' corresponding to the first electrode groups 10' can simulate sawteeth A, widths W of which decrease progressively in the direction O'B'. In addition, the first electrode layer 1' generally includes two sub-electrode layers, and the first electrodes 101' are alternately disposed in different sub-electrode layers. A gap between two adjacent first electrodes 101' disposed in a same sub-electrode layer is equal or approximately equal to the width L' of the first electrode 101' disposed in the other sub-electrode layer, an orthographic projection of which on the second substrate 02' is located between orthographic projections of the two adjacent first electrodes 101' second substrate 02'.

In the liquid crystal lens 100', a transverse electric field is generated between adjacent first electrodes 101' disposed in the same sub-electrode layer. The transverse electric field may interfere with the driving electric field which can drive the liquid crystal molecules to rotate (an electric field direction of the driving electric field is perpendicular to the first substrate 01'), which is referred to as an interference electric field. In the direction O'B', as the widths of the first electrodes 101' decrease progressively, the gap between any adjacent first electrodes 101' disposed in the same sub-electrode layer decreases progressively, and an intensity of the interference electric field increases progressively, causing the influence of the interference electric field on the driving electric field to gradually increase. Therefore, under driving of a driving voltage formed by a same group of first driving signals $SD_1'$ and a same second driving signal $SD_2'$, the liquid crystal molecules at the center can reach an expected deflection angle, whereas the liquid crystal molecules at the edge cannot reach the expected deflection angle due to the influence of the interference electric field. As a result, a refractive index coefficient at the edge cannot reach a required refractive index coefficient, and an image at the edge is unclear, and a field of view (FOV) of the liquid crystal lens 100' is small. For example, in some related arts, the FOV of the liquid crystal lens 100' is only approximately −13.7° to approximately +13.7°.

Figure 4:
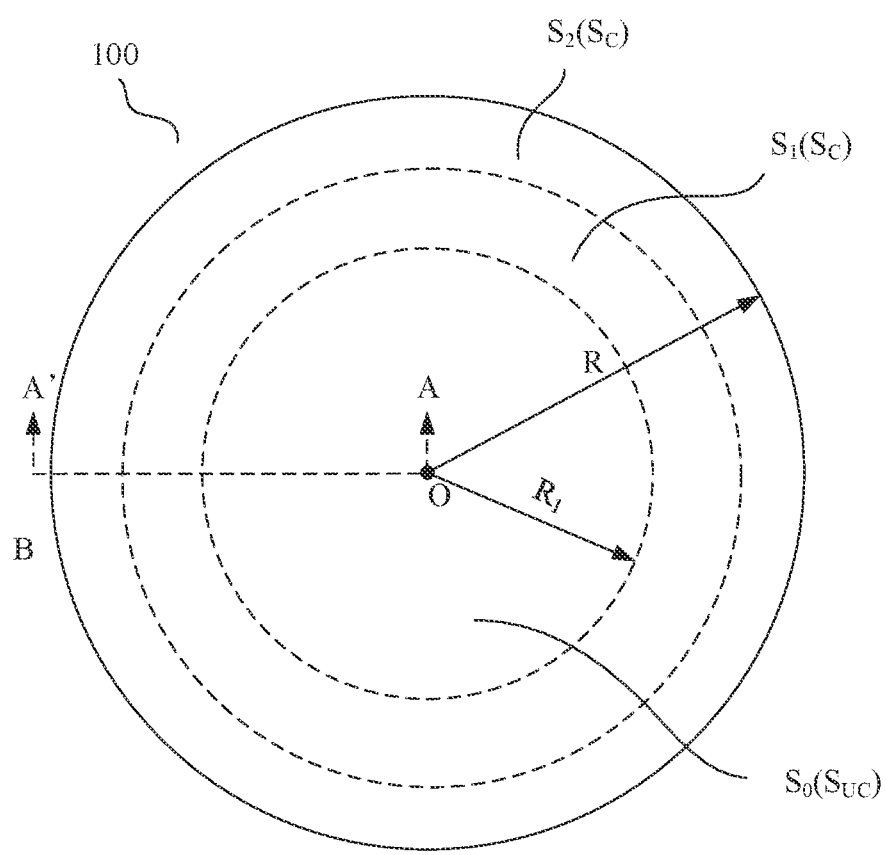
FIG. 4 is a schematic top view showing a structure of a liquid crystal lens, in accordance with some embodiments of the present disclosure.
Figure 5:
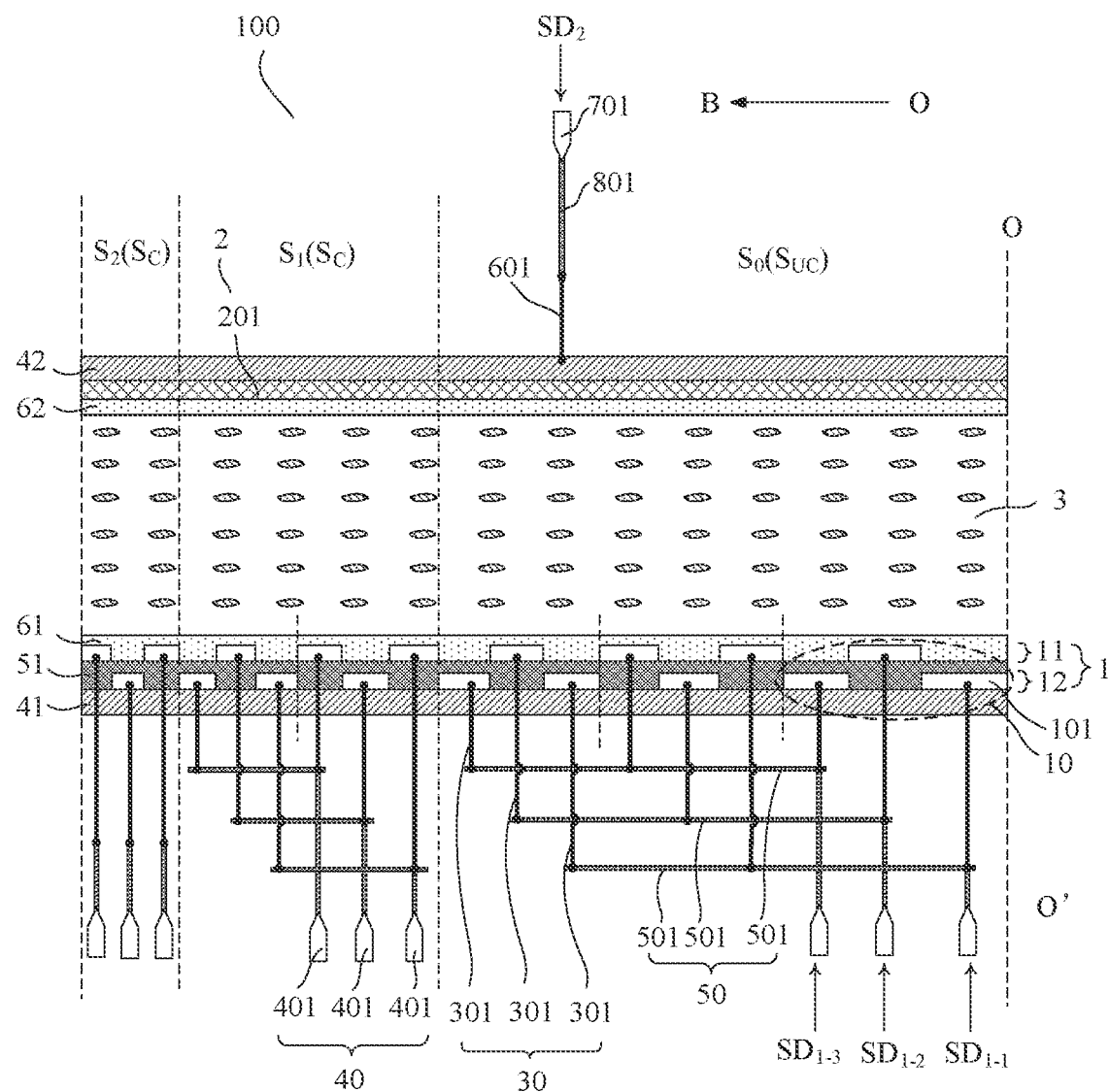
FIG. 5 is a schematic section showing a structure of a liquid crystal lens along the dashed line AA' in FIG. 4, in accordance with some embodiments of the present disclosure.
Figure 6:
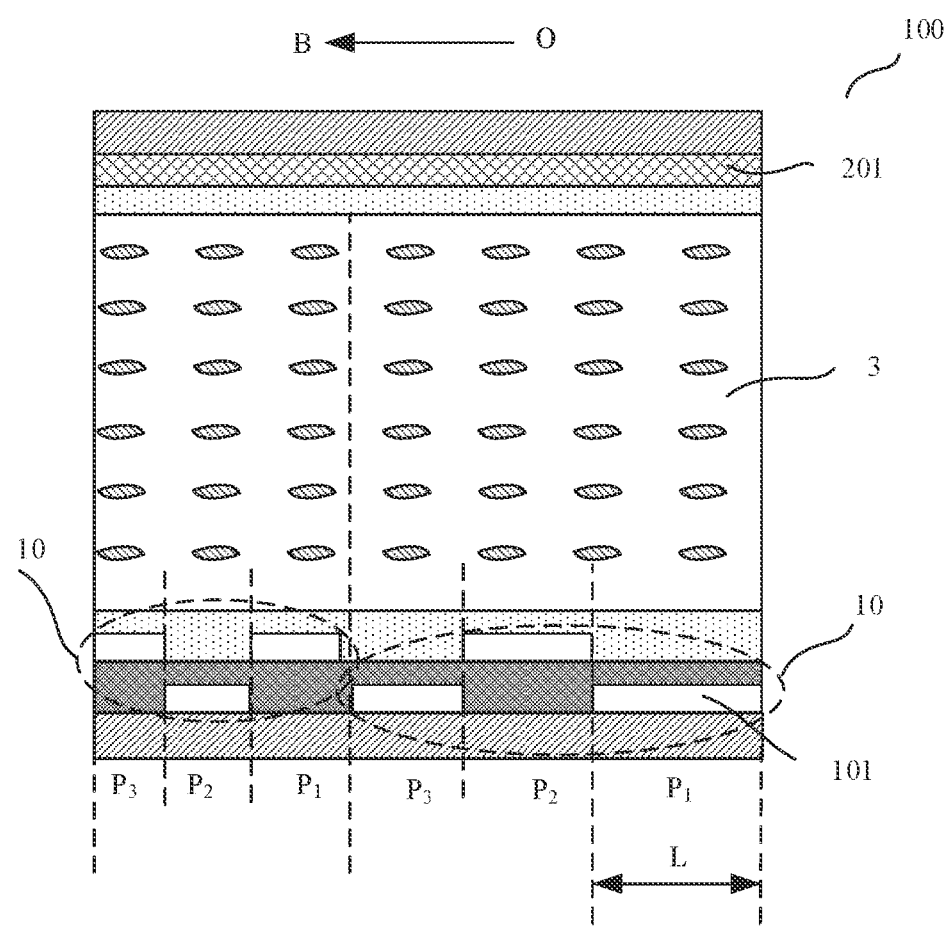
FIG. 6 is a schematic diagram showing a structure of a first electrode group of a liquid crystal lens, in accordance with some embodiments of the present disclosure.

Some embodiments of the present disclosure provide a liquid crystal lens 100. Referring to FIGS. 4, 5 and 6, the liquid crystal lens 100 has at least two driving regions (e.g., a driving region $S_0$, a driving region $S_1$ and a driving region $S_2$). The liquid crystal lens 100 includes a first electrode layer 1 and a second electrode layer 2, and the first electrode layer 1 and the second electrode layer 2 are oppositely disposed.

The first electrode layer 1 includes a plurality of first electrode groups 10, each of the plurality of first electrode groups 10 includes a plurality of first electrodes 101, and the plurality of first electrodes 101 included in each first electrode group 10 are configured to receive a plurality of first driving signals $SD_1$ in a one-to-one correspondence manner. Each of the at least two driving regions of the liquid crystal lens 100 corresponds to at least one first electrode group 10. The second electrode layer 2 includes at least one second electrode 201, and the at least one second electrode 201 is configured to receive at least one second driving signal $SD_2$ in a one-to-one correspondence manner.

In a same driving region, driving voltage(s) formed between the first driving signal(s) $SD_1$ received by the first electrode(s) 101 at the same position in the first electrode group(s) 10 and the second driving signal(s) $SD_2$ received by the corresponding second electrode(s) 201 are equal or approximately equal.

In different driving regions, a driving voltage formed between the first driving signal(s) $SD_1$ received by the first electrode(s) 101 at a same position in the first electrode group(s) 10 and the second driving signal(s) $SD_2$ received by the corresponding second electrode(s) 201 in one driving region is different from a driving voltage formed between first driving signal(s) received by first electrode(s) at the same position in first electrode group(s) and second driving signal(s) received by corresponding second electrode(s) in another driving region, and absolute values of the driving voltages progressively increase in a radial direction of the liquid crystal lens and in a direction OB from a center O to an edge B of the liquid crystal lens.

In this way, the absolute values of the driving voltages formed between the first driving signals $SD_1$ received by the first electrodes 101 at the same position in different driving regions of the liquid crystal lens 100 and the second driving signals $SD_2$ received by the corresponding second electrodes 201 progressively increase in the direction OB. Therefore, the absolute values of the driving voltages received by portions of the liquid crystal layer 3 in different driving regions corresponding to the first electrodes 101 at the same position progressively increase in the direction OB. It will be seen that, compared with a driving voltage formed by a first electrode 101 at a certain position at the center of the liquid crystal lens 100 and a corresponding second electrode 2, a driving voltage formed by a first electrode 101 at the same position at the edge and a corresponding second electrode 2 increases. In this way, the increased driving voltage at the edge makes the liquid crystal molecules (which could not reach the expected deflection angle due to the influence of the interference electric field) rotate further, and the deflection angles become larger, so that the deflection angles of the liquid crystal molecules at the edge are close to or even reach the required deflection angle. As a result, the refractive index coefficient of the edge of the liquid crystal lens 100 can also reach the required refractive index coefficient to make the image displayed at the edge clear, and the FOV of the liquid crystal lens 100 increases.

It will be noted that, the number of first electrodes 101 included in each first electrode group 10 of the liquid crystal lens 100 is not limited herein. The number of first electrodes 101 included in each first electrode group 10 can be set according to actual usage requirements.

For example, referring to FIG. 5, each first electrode group 10 in the liquid crystal lens 100 includes three first electrodes 101. As another example, referring to FIG. 15, each first electrode group 10 in the liquid crystal lens 100 includes six first electrodes 101.

In some embodiments, referring to FIG. 5, the liquid crystal lens 100 further includes a plurality of first signal line groups 30 and at least one second signal line 601. The plurality of first signal line groups 30 are in one-to-one correspondence with the plurality of first electrode groups 10. Each first signal line group 30 includes a plurality of first signal lines 301. The plurality of first signal lines 301 included in each first signal line group 30 are electrically connected to the plurality of first electrodes 101 included in a corresponding first electrode group 10 in a one-to-one correspondence manner, and each first signal line 301 is configured to transmit a first driving signal $SD_1$ to a first electrode 101 electrically connected thereto. The at least one second signal line 601 is electrically connected to the at least one second electrode 201 in a one-to-one correspondence manner, and each second signal line 601 is configured to transmit a second driving signal $SD_2$ to a second electrode 201 electrically connected thereto.

Herein, the liquid crystal lens 100 transmits the first driving signals $SD_1$ to a corresponding first electrode group 10 through each first signal line group 30, so that each first electrode group 10 can receive the first driving signals $SD_1$ independently.

In addition, the liquid crystal lens 100 transmits the first driving signal $SD_1$ to a corresponding first electrode 101 through a respective first signal line 301, and transmits the second driving signal $SD_2$ to a corresponding second electrode 201 through a respective second signal line 601, so that each first electrode 101 can receive the first driving signal $SD_1$ independently, and each second electrode 201 can receive the second driving signal $SD_2$ independently, realizing independent control of voltages of each first electrode 101 and each second electrode 201.

In some embodiments, referring to FIGS. 4 and 5, the liquid crystal lens 100 further includes at least two first signal receiving terminal groups 40 in one-to-one correspondence with the at least two driving regions, and each first signal receiving terminal group 40 includes a plurality of first signal receiving terminals 401.

With respect to each driving region, the plurality of first signal lines 301 included in each first signal line group 30 are electrically connected to the plurality of first signal receiving terminals 401 included in a corresponding first signal receiving terminal group 40 respectively, and the first signal line(s) 301 electrically connected to the first electrode(s) 101 at the same position in the first electrode group(s) 10 are electrically connected to a same first signal receiving terminal 401.

Herein, the first signal line 301 electrically connects the corresponding first electrode 101 with the corresponding first signal terminal 401, and the liquid crystal lens 100 can transmit the same first driving signal $SD_1$ to the first signal line(s) 301 at the same position in the same driving region through the same first signal receiving terminal 401, so that voltage(s) of the first electrode(s) 101 at the same position in the same driving region are equal or approximately equal. In this way, each driving region only needs to correspond to one first signal receiving terminal group 40 to realize transmission of the first driving signals $SD_1$. Therefore, the number of first signal receiving terminal groups 40 in the liquid crystal lens 100 is relatively small.

In some embodiments, referring to FIG. 5, the liquid crystal lens 100 further includes at least two first connecting line groups 50 in one-to-one correspondence with the at least two first signal receiving terminal groups 40, and each first connecting line group 50 includes a plurality of first connecting lines 501.

With respect to each driving region, the plurality of first signal lines 301 included in each first signal line group 30 are electrically connected to the plurality of first signal receiving terminals 401 included in a corresponding first signal receiving terminal group 40 respectively through the plurality of first connecting lines 501 included in a corresponding first connecting line group 50, and the first signal line(s) 301 electrically connected to the first electrode(s) 101 at the same position in the first electrode group(s) 10 are electrically connected to the same first signal receiving terminal 401 through a same first connecting line 501.

Herein, the first connecting line 501 electrically connects the corresponding first signal line 301 with the corresponding first signal receiving terminal 401, and thus the liquid crystal lens 100 can transmit the first driving signal $SD_1$ to a corresponding first electrode 101 through each first connecting line 501. In addition, each first signal receiving terminal 401 corresponds to one first connecting line 501, and there is no need that each first signal line 301 is electrically connect to a corresponding first signal receiving terminal 401 directly, thereby saving wiring space and simplifying the structure of the liquid crystal lens 100.

In some embodiments, referring to FIG. 5, the liquid crystal lens 100 further includes at least one second signal receiving terminal 701 electrically connected to the at least one second signal line 601 in a one-to-one correspondence manner.

In this way, the liquid crystal lens 100 transmits the second driving signal $SD_2$ to a corresponding second electrode 201 through each second signal receiving terminal 701.

In some embodiments, referring to FIG. 5, the liquid crystal lens 100 further includes at least one second connecting line 801 electrically connected to the at least one second signal receiving terminal 701 in a one-to-one correspondence manner, and each second signal line 601 is electrically connected to a corresponding second signal receiving terminal 701 through one second connecting line 801.

In this way, a second connecting line 801 electrically connects a corresponding second signal line 601 with a corresponding second signal receiving terminal 701, and thus the liquid crystal lens 100 can transmit the second driving signal $SD_2$ to a corresponding second electrode 201 through each second connecting line 801.

In some embodiments, referring to FIG. 5, the liquid crystal lens 100 further includes a first insulating layer 51. The first electrode layer 1 includes a first sub-electrode layer 11 and a second sub-electrode layer 12 that are disposed in a stack, and the first insulating layer 51 is located between the first sub-electrode layer 11 and the second sub-electrode layer 12. In the plurality of first electrodes 101 included in the plurality of first electrode groups 10 of the liquid crystal lens 100, a part of the first electrodes 101 are disposed in the first sub-electrode layer 11, and the other part of the first electrodes 101 are disposed in the second sub-electrode layer 12.

For example, in the radial direction of the liquid crystal lens 100 and in the direction OB from the center O to the edge B of the liquid crystal lens, the plurality of first electrodes 101 included in the plurality of first electrode groups 10 are alternately disposed in the first sub-electrode layer 11 and the second sub-electrode layer 12.

Herein, the first sub-electrode layer 11 is insulated and separated from the second sub-electrode layer 12 by the first insulating layer 51, and every two adjacent first electrodes 101 in the first electrode layer 1 are disposed in different sub-electrode layers, which makes it unnecessary to have a gap between orthographic projections of the first electrodes 101 on a first base 41. In this way, the first electrodes 101 can be closely arranged, there is no electrical connection therebetween, but each can independently receive the first driving signal $SD_1$. As a result, the driving electric field in the liquid crystal lens 100 can control the liquid crystal molecules more effectively, and the number of liquid crystal molecules in the liquid crystal layer 3 that are not within an effective control range of the driving electric field is small or even zero, thereby improving control precision of the liquid crystal lens 100 to the liquid crystal molecules thereof.

In some embodiments, referring to FIGS. 4 and 5, the at least two driving regions included in the liquid crystal lens 100 are divided into two types of driving regions: a compensation driving region $S_C$ and a non-compensation driving region $S_{UC}$. For example, the liquid crystal lens 100 includes one non-compensation driving region $S_{UC}$ and at least one compensation driving region $S_C$. The non-compensation driving region $S_{UC}$ is located at the center O of the liquid crystal lens 100, a shape of each compensation driving region $S_C$ is annular, and the at least one compensation driving region $S_C$ is sequentially arranged around the non-compensation driving region $S_{UC}$ in the direction OB. For example, as shown in FIG. 5, the liquid crystal lens 100 includes three driving regions $S_0$, $S_1$ and $S_2$. The driving region $S_0$ is the non-compensation driving region $S_{UC}$, and each of the driving regions $S_1$ and $S_2$ is the compensation driving region $S_C$.

It will be noted that, the "compensation driving region" refers to a driving region in which a driving voltage needs to be compensated. Since the interference electric field has a great influence on the deflection angles of the liquid crystal molecules in this type of driving region, a voltage value of the driving voltage needs to be increased, so that the deflection angles are increased to reach required deflection angles, which is equivalent to the driving voltage in this type of driving region is compensated. Therefore, this type of driving region is referred to as a compensation driving region.

The "non-compensation driving region" refers to a driving region in which the driving voltage does not need to be compensated. Since the interference electric field has a small effect on the deflection angles of the liquid crystal molecules in this type of driving region, which is almost negligible, the required deflection angles can be achieved without increasing the voltage value of the driving voltage, which is equivalent to there is no need to compensate the driving voltage in this type of driving region. Therefore, this type of driving region is referred to as a non-compensation driving region.

The embodiments of the present disclosure do not specifically limit a position of a boundary between the non-compensation driving region $S_{UC}$ and the nearest compensation driving region $S_C$. Since the intensity of the interference electric field generated between two adjacent first electrodes 101 gradually increases in the direction OB, in some examples, a position of the first electrode 101 corresponding to a maximum critical value of the interference electric field within the acceptable range is set as the boundary between the non-compensation driving region and the nearest compensation driving region. That is, a region where first electrodes 101 within the first electrode 101 (inclusive) in a direction BO corresponding to the maximum critical value of the interference electric field in the acceptable range are located is a non-compensation driving region, and a region where first electrodes 101 outside the first electrode 101 (exclusive) in the direction OB corresponding to the maximum critical value of the interference electric field within the acceptable range are located is a compensation driving region.

It will be noted that, the intensity of the interference electric field is within the acceptable range, which means that the influence of the interference electric field on the deflection angles of the liquid crystal molecules is small and can be almost ignored.

It will be seen from the above description that in the liquid crystal lens 100, widths of the first electrodes 101 decrease progressively in the direction OB. In some embodiments, a width of the first electrode 101 corresponding to the maximum critical value of the interference electric field within the acceptable range is referred to as a preset dimension $L_0$.

In the non-compensation driving region $S_{UC}$ of the liquid crystal lens 100, a width L of each first electrode 101 included in each first electrode group 10 is greater than or equal to the preset dimension $L_0$. In this way, in the non-compensation driving region $S_{UC}$, a gap between adjacent first electrodes 101 in the same sub-electrode layer is large, and the influence of the generated interference electric field on the deflection angles of the liquid crystal molecules is small and can be almost ignored. Therefore, the deflection angles of the liquid crystal molecules can still reach the expected deflection angle even if the driving voltage in the non-compensation driving region $S_{UC}$ is not compensated.

In the compensation driving region $S_C$ of the liquid crystal lens 100, a width L of each first electrode 101 included in each first electrode group 10 is less than the preset dimension $L_0$. In this way, in the compensation driving region $S_C$, the gap between adjacent first electrodes 101 in the same sub-electrode layer is small, and the influence of the generated interference electric field on the deflection angles of the liquid crystal molecules is large, which results in that the deflection angles of the liquid crystal molecules cannot reach the expected deflection angle. Therefore, compensating the driving voltage in the compensation driving region $S_C$ can increase the deflection angles of the liquid crystal molecules, so that the deflection angles of the liquid crystal molecules are closer to or even reach the required deflection angle.

For example, the preset dimension $L_0$ is 10.3 μm. Referring to FIGS. 4 and 5, a shape of the liquid crystal lens 100 is circular, and a radius R thereof is 8.36 mm. The non-compensation driving region $S_{UC}$ is circular, and the two compensation driving regions $S_C$ are annular. The width L of each first electrode 101 included in each first electrode group 10 in the non-compensation driving region $S_{UC}$ is within a range from 10.9 μm to 320.9 μm, and the width L of each first electrode 101 included in each first electrode group 10 in the compensation driving region $S_C$ is within a range from 3.9 μm to 10.9 μm (excluding 10.9 μm). In this case, a radius $R_1$ of the non-compensation driving region $S_{UC}$ is equal to 3.17 mm; an inner diameter of a driving region $S_1$ (serving as the compensation driving region $S_C$) arranged around the non-compensation driving region $S_{UC}$ is 3.17 mm, and an outer diameter thereof is 4.65 mm; and an inner diameter of a driving region $S_2$ arranged around the driving region $S_1$ is 4.65 mm, and an outer diameter thereof is 8.36 mm.

The embodiments of the present disclosure do not limit the number of driving regions included in the liquid crystal lens 100. In some embodiments, the number of driving regions is related to a size of the liquid crystal lens 100 and required control precision of the liquid crystal lens 100.

In some examples, the number of driving regions is increased or decreased according to the size of the liquid crystal lens 100. For example, if a diameter of the liquid crystal lens 100 is large, the number of driving regions is increased accordingly. For another example, if the diameter of the liquid crystal lens 100 is small, the number of driving regions is decreased accordingly.

In some other examples, in a case where the size of the liquid crystal lens 100 is constant, the number of driving regions is increased or decreased according to the required control precision. For example, if the liquid crystal lens 100 has a high requirement for control precision, a relatively large number of driving regions may be provided. For another example, if the liquid crystal lens 100 has a low requirement for control precision, a relatively small number of driving regions may be provided. In this way, the number of first connecting lines 501 and the number of first signal receiving terminals 401 of the liquid crystal lens 100 can be reduced, thereby simplifying an internal structure of the liquid crystal lens 100.

For example, the liquid crystal lens 100 has 3 to 8 driving regions.

Figure 7:
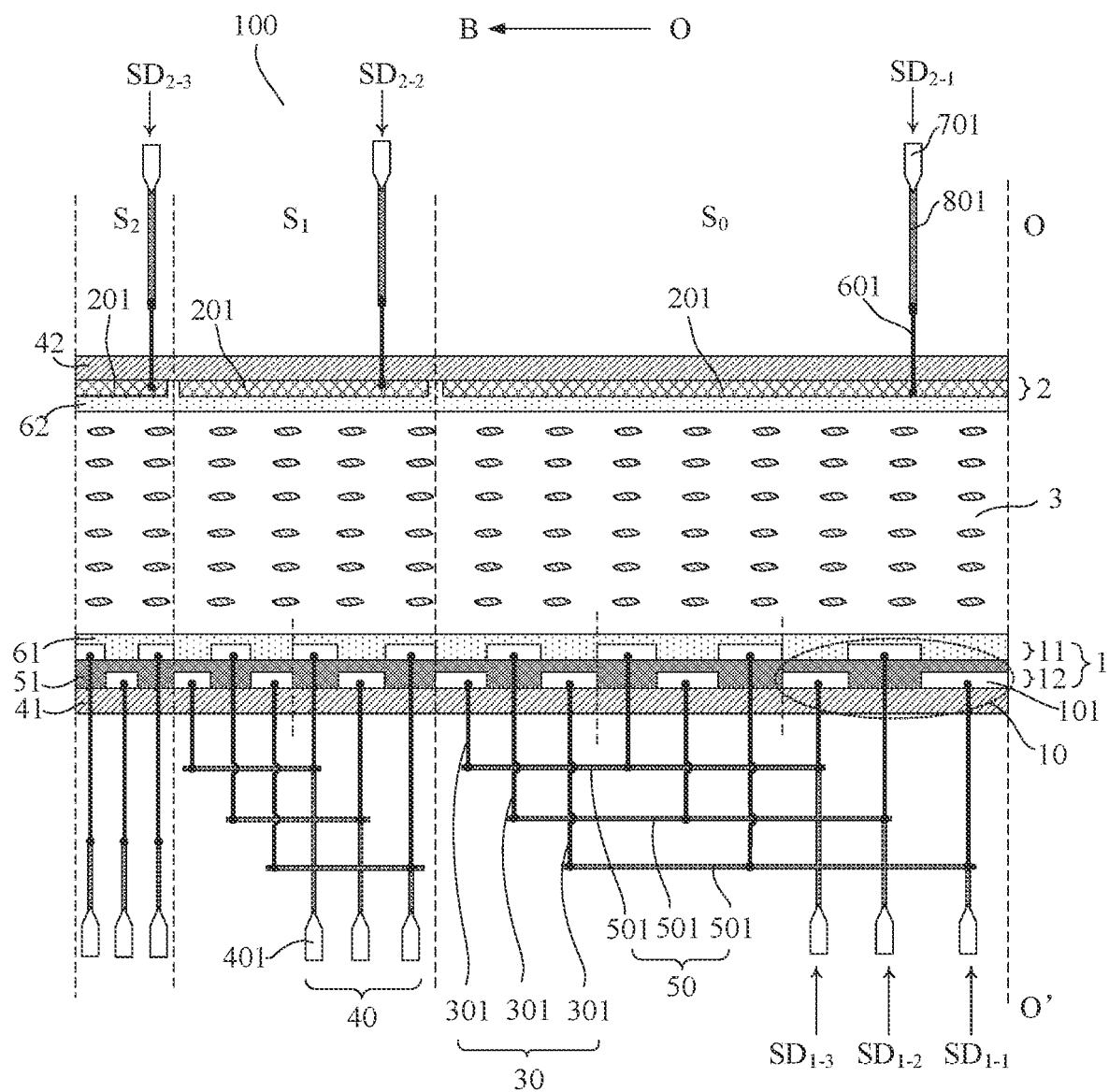
FIG. 7 is a schematic section showing a structure of another liquid crystal lens along the dashed line AA' in FIG. 4, in accordance with some embodiments of the present disclosure.
Figure 8:
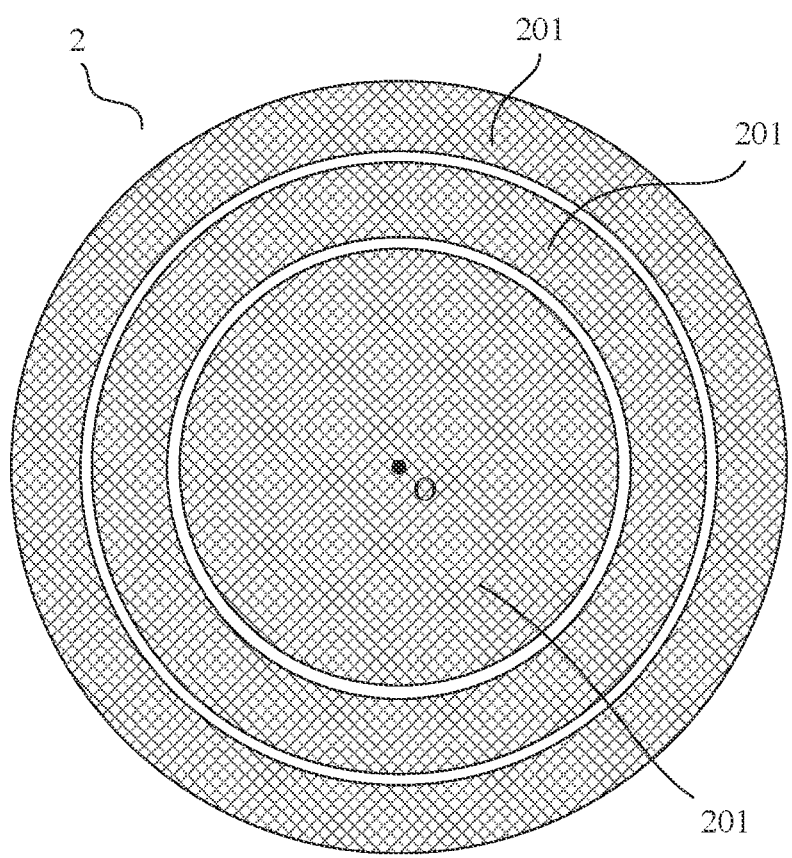
FIG. 8 is a schematic top view of a second electrode layer of a liquid crystal lens, in accordance with some embodiments of the present disclosure.

In some embodiments, referring to FIGS. 4, 7 and 8, the second electrode layer 2 of the liquid crystal lens 100 includes at least two second electrodes 201. The at least two second electrodes 201 are disposed in a same layer, there is a gap between two adjacent second electrodes 201 to keep the two adjacent second electrodes insulated from each other, and the at least two driving regions are in one-to-one correspondence with the at least two second electrodes 201.

The second electrode 201 corresponding to each driving region can independently receive the second driving signal $SD_2$. In this way, in the direction OB, the second driving signals $SD_2$ with different voltage values are transmitted to the second electrodes 201 corresponding to different driving regions, and then a driving voltage formed between the first driving signal $SD_1$ received by the first electrode(s) 101 at the same position in the first electrode group(s) 10 and the second driving signal $SD_2$ received by the corresponding second electrode 201 in one driving region is different from a driving voltage formed between first driving signal(s) received by first electrode(s) at the same position in first electrode group(s) and second driving signal(s) received by corresponding second electrode(s) in another driving region. Thus, by adjusting magnitude of the voltage values of the second driving signals $SD_2$ received by the second electrodes 201, the absolute values of the driving voltages increase progressively in the direction OB.

For example, in the direction OB, the voltage values of the second driving signals $SD_2$ received by the second electrodes 201 corresponding to the driving regions increase progressively, and the first driving signals $SD_1$ received by each first electrode group 10 are a same group of first driving signals $SD_1$. It will be noted that, with respect to the same group of first driving signals $SD_1$ herein, the voltage values of the first driving signals $SD_1$ received by the first electrodes 101 at the same position in the first electrode groups 10 are equal or approximately equal.

As another example, in the direction OB, the voltage values of the second driving signals $SD_2$ received by the second electrodes 201 corresponding to the driving regions increase progressively, and in different driving regions, the first driving signals $SD_1$ received by the first electrodes 101 at the same position in the first electrode groups 10 increase progressively.

In some other embodiments, referring to FIGS. 9 to 14, the liquid crystal lens 100 further includes a second insulating layer 52. The second electrode layer 2 includes a third sub-electrode layer 21 and a fourth sub-electrode layer 22 that are disposed in a stack, and the second insulating layer 52 is located between the third sub-electrode layer 21 and the fourth sub-electrode layer 22. The second electrode layer 2 includes at least two second electrodes 201. At least one second electrode 201 is disposed in the third sub-electrode layer 21, and remaining second electrode(s) 201 are disposed in the fourth sub-electrode layer 22.

Figure 9:
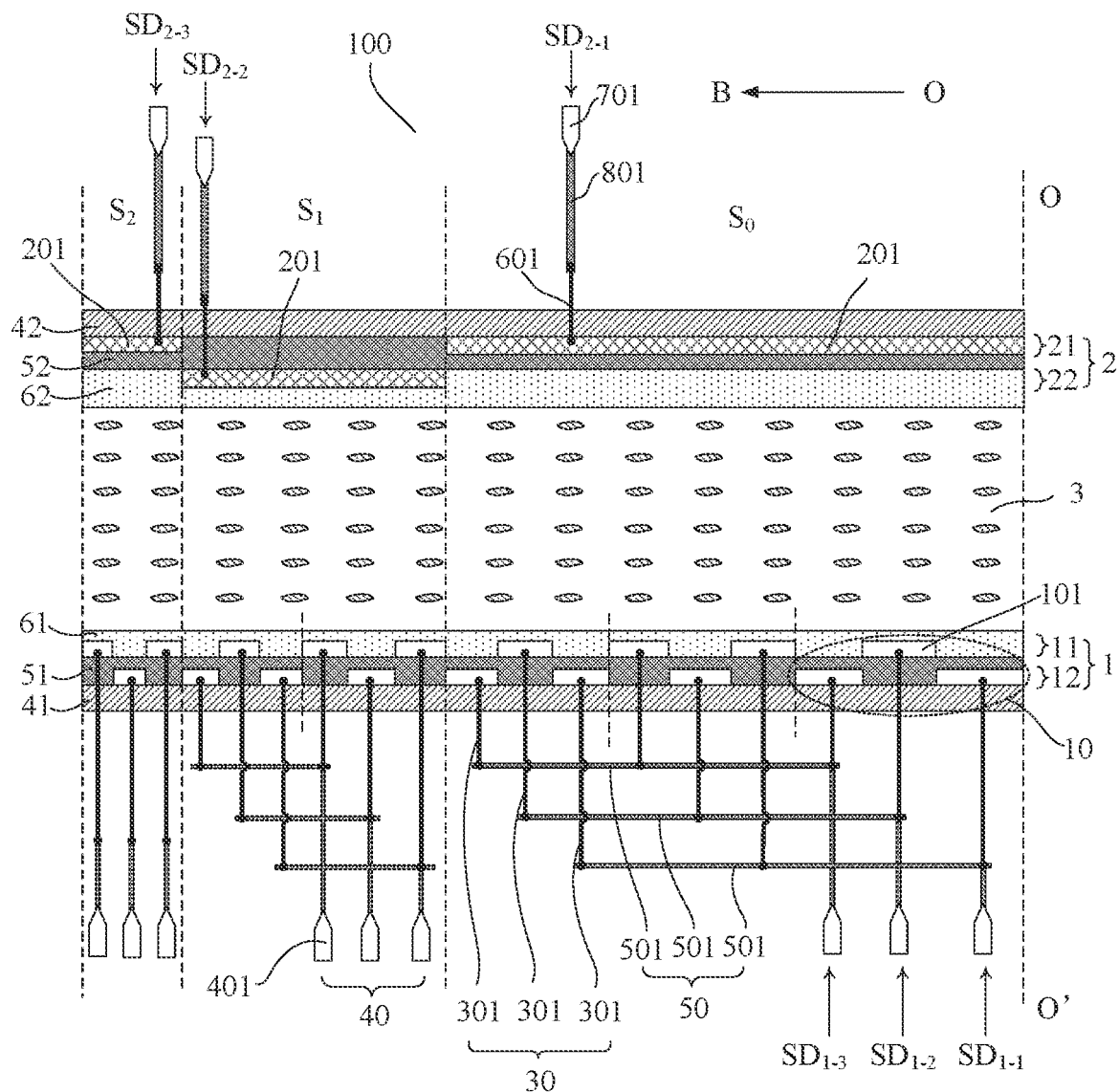
FIG. 9 is a schematic section showing a structure of yet another liquid crystal lens along the dashed line AA' in FIG. 4, in accordance with some embodiments of the present disclosure.
Figure 10:
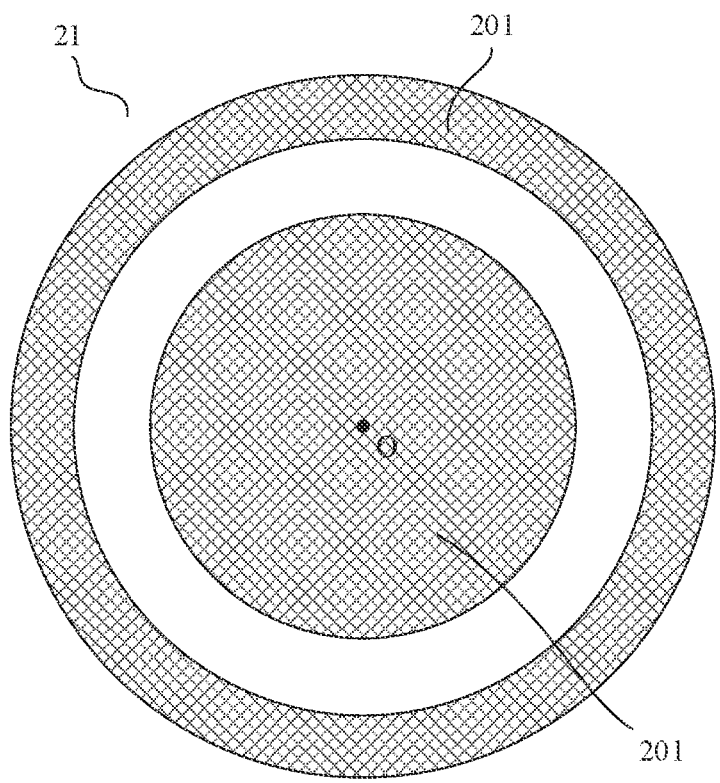
FIG. 10 is a schematic top view of a third sub-electrode layer of a liquid crystal lens, in accordance with some embodiments of the present disclosure.
Figure 11:
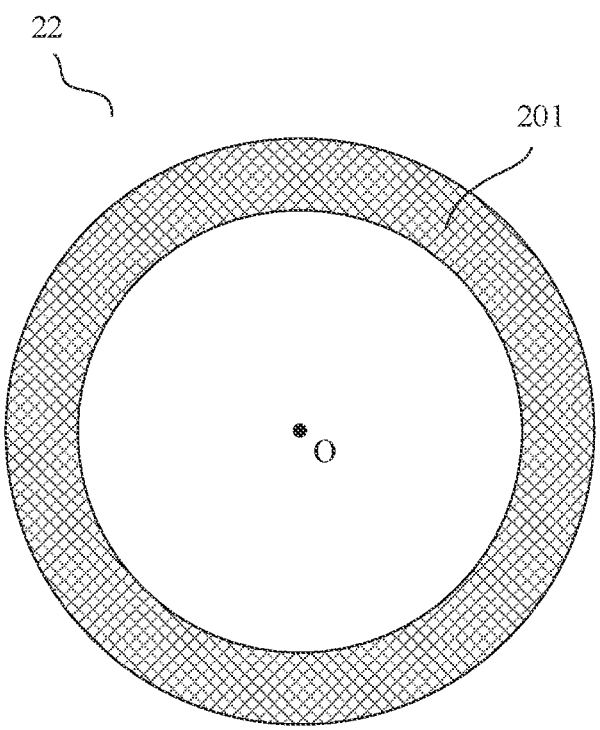
FIG. 11 is a schematic top view of a fourth sub-electrode layer of a liquid crystal lens, in accordance with some embodiments of the present disclosure.

For example, referring to FIGS. 9 to 11, in the radial direction of the liquid crystal lens 100 and in the direction OB from the center O to the edge B of the liquid crystal lens 100, the at least two second electrodes 201 included in the second electrode layer 2 are alternately disposed in the third sub-electrode layer 21 and the fourth sub-electrode layer 22.

Adjacent second electrodes 201 in the second electrode layer 2 are disposed in different sub-electrode layers, and there is a gap between the second electrodes 201 located in the same sub-electrode layer. For example, referring to FIG. 10, there is a gap between the two second electrodes 201 located in the third sub-electrode layer 21. In this way, the second electrodes 201 can be closely arranged without being electrically connected to each other. Thus, the arrangement of the driving electric field is more compact, the number of liquid crystal molecules in the liquid crystal layer 3 that cannot be within a control range of the driving electric field is reduced, thereby improving control precision of the liquid crystal lens 100 to the liquid crystal molecules thereof.

Figure 12:
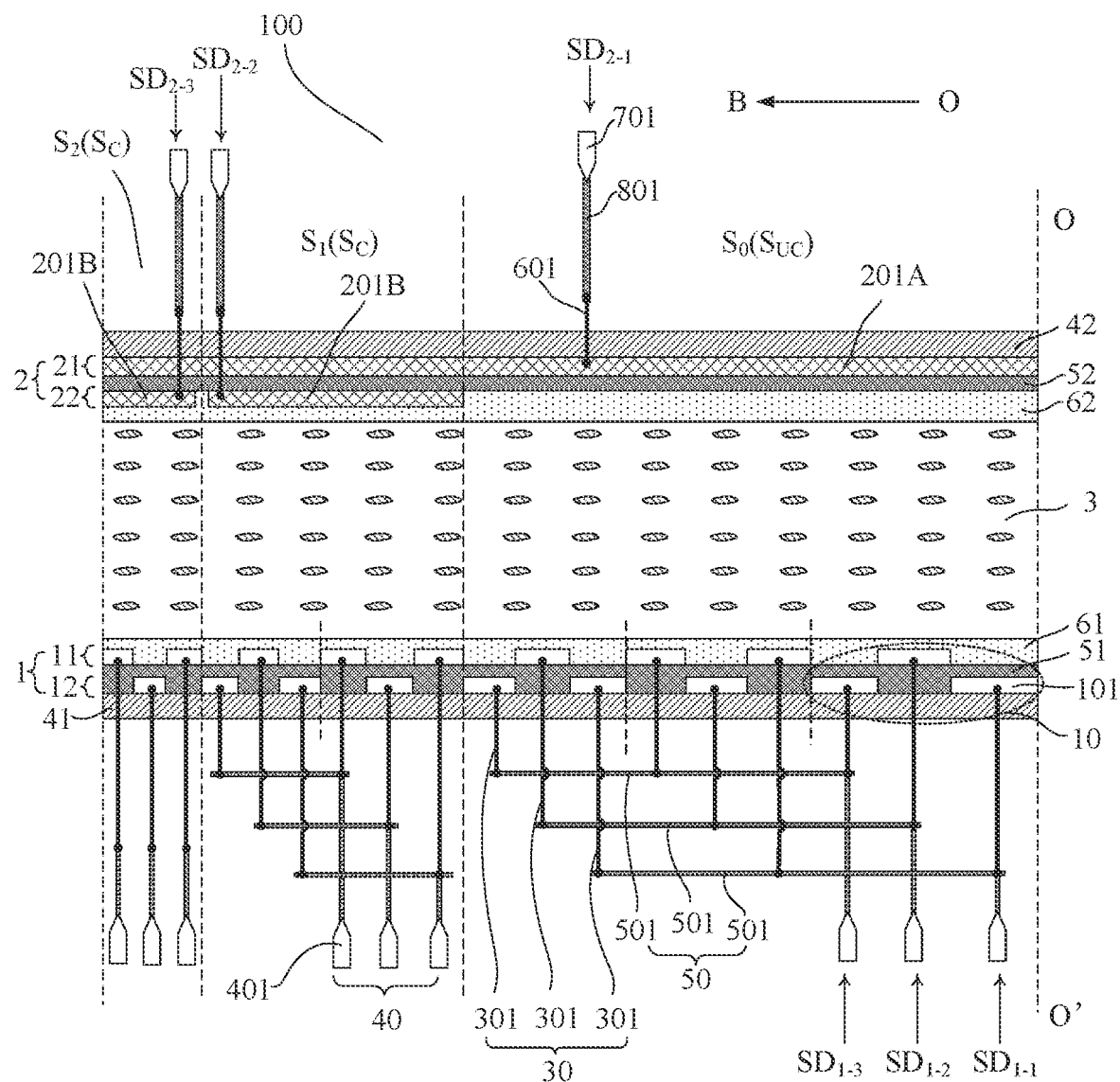
FIG. 12 is a schematic section showing a structure of yet another liquid crystal lens along the dashed line AA' in FIG. 4, in accordance with some embodiments of the present disclosure.
Figure 13:
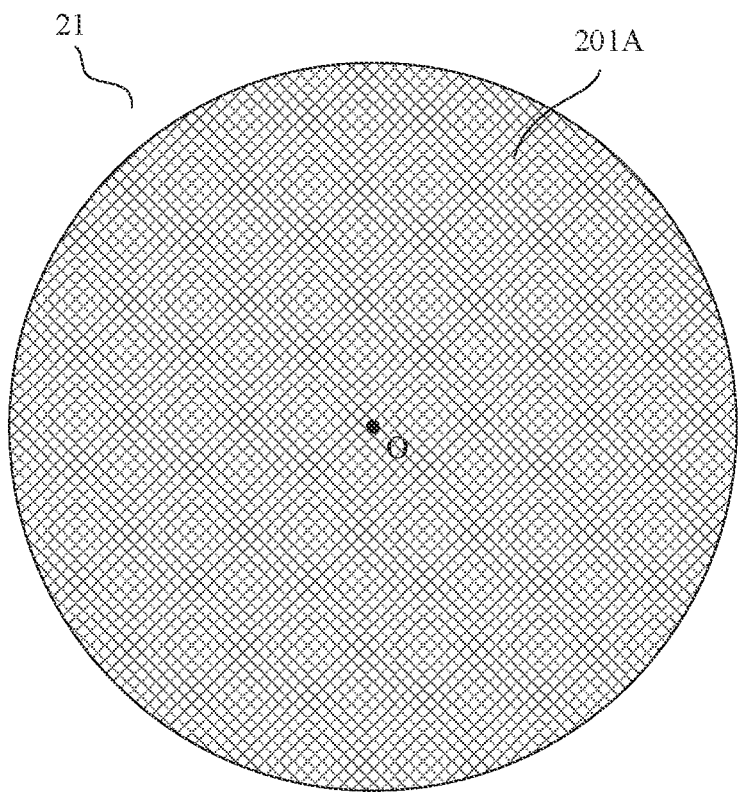
FIG. 13 is a schematic top view of a third sub-electrode layer of another liquid crystal lens, in accordance with some embodiments of the present disclosure.
Figure 14:
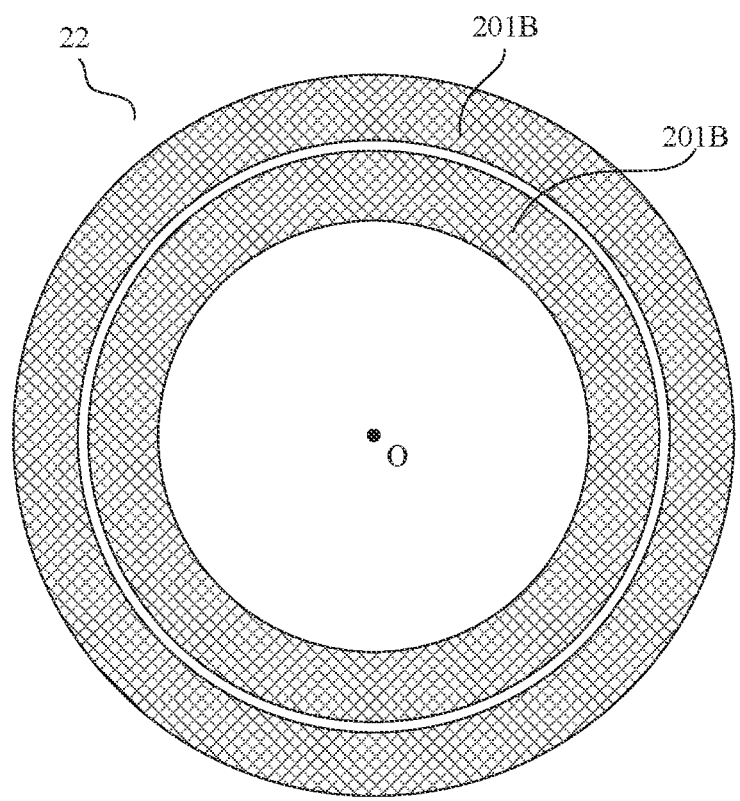
FIG. 14 is a schematic top view of a fourth sub-electrode layer of another liquid crystal lens, in accordance with some embodiments of the present disclosure.

As another example, referring to FIGS. 12 to 14, one second electrode 201 of the at least two second electrodes 201 included in the second electrode layer 2 is a circular electrode 201A or a whole electrode, and remaining second electrodes 201 are annular electrodes 201B.

The circular electrode 201A or the whole electrode is disposed in one of the third sub-electrode layer 21 and the fourth sub-electrode layer 22, and the annular electrode(s) 201B are disposed in the other of the third sub-electrode layer 21 and the fourth sub-electrode layer 22.

It will be noted that, FIGS. 12 to 14 are only shown by taking an example in which the circular electrode 201A or the whole electrode is disposed in the third sub-electrode layer 21, and the annular electrodes 201B are disposed in the fourth sub-electrode layer 22, which, however, should not be a limitation to the present disclosure. In some other embodiments of the present disclosure, the circular electrode 201A or the whole electrode may be disposed in the fourth sub-electrode layer 22, and the annular electrodes 201B may be disposed in the third sub-electrode layer 21.

In the second electrode layer 2 of the liquid crystal lens 100 in the present disclosure, the annular electrode 201B is stacked with the circular electrode 201A or the whole electrode, and there is an overlapping region between an orthographic projection of the circular electrode 201A or the whole electrode on the first base 41 and an orthographic projection of the annular electrode 201B on the first base 41 (referring to FIG. 12). A voltage value of a portion of the second electrode layer 2 corresponding to the overlapping region is a voltage superposition value of the second driving signal $SD_2$ received by the circular electrode 201A or the whole electrode and the second driving signal $SD_2$ received by the annular electrode 201B. In this way, by adjusting the voltage values of the annular electrodes 201B, driving voltages with different voltage values can be formed in different driving regions corresponding to the annular electrodes 201B. In the direction OB, if the voltage values of the second driving signals $SD_2$ received by the annular electrodes are made to increase progressively, the voltage values of the driving voltages in different driving regions increase progressively in the direction OB, so that the deflection angles of the liquid crystal molecules in the edge portion of the liquid crystal lens 100 are close to or even reach the required deflection angle.

In some embodiments, as shown in FIGS. 4, and 12 to 14, in a case where the at least two driving regions of the liquid crystal lens 100 include the non-compensation driving region $S_{UC}$ and at least one compensation driving region $S_C$, the annular electrodes 201B correspond to the driving region $S_1$ and the driving region $S_2$, and both the driving regions $S_1$ and $S_2$ serve as the compensation driving regions $S_C$. In a case where the second electrode layer 2 includes the circular electrode 201A, the circular electrode 201A corresponds to the driving region $S_0$, and the driving region $S_0$ herein serves as the non-compensation driving regions $S_{UC}$.

It will be noted that, a connection between the first electrode 101 and the first signal line 301, a connection between the first signal line 301 and the first connecting line 501, a connection between the first connecting line 501 and the first driving signal receiving terminal 401, a connection between the second electrode 201 and the second signal line 601, a connection between the second signal line 601 and the second connecting line 801, and a connection between the second connecting line 801 and the second driving signal receiving terminal 701 shown in FIGS. 5, 7, 9, 12, 15 and 17 are merely an illustration of an electrical connection to distinguish the driving signals transmitted or received by the components as described above, which cannot be taken as a definition of an actual connection structure in the liquid crystal lens 100. Those skilled in the art may design and arrange the actual electrical connection structure in the liquid crystal lens 100 according to actual needs based on the electrical connection schematic diagrams of the components in the liquid crystal lens 100 in the figures as described above.

Figure 16:
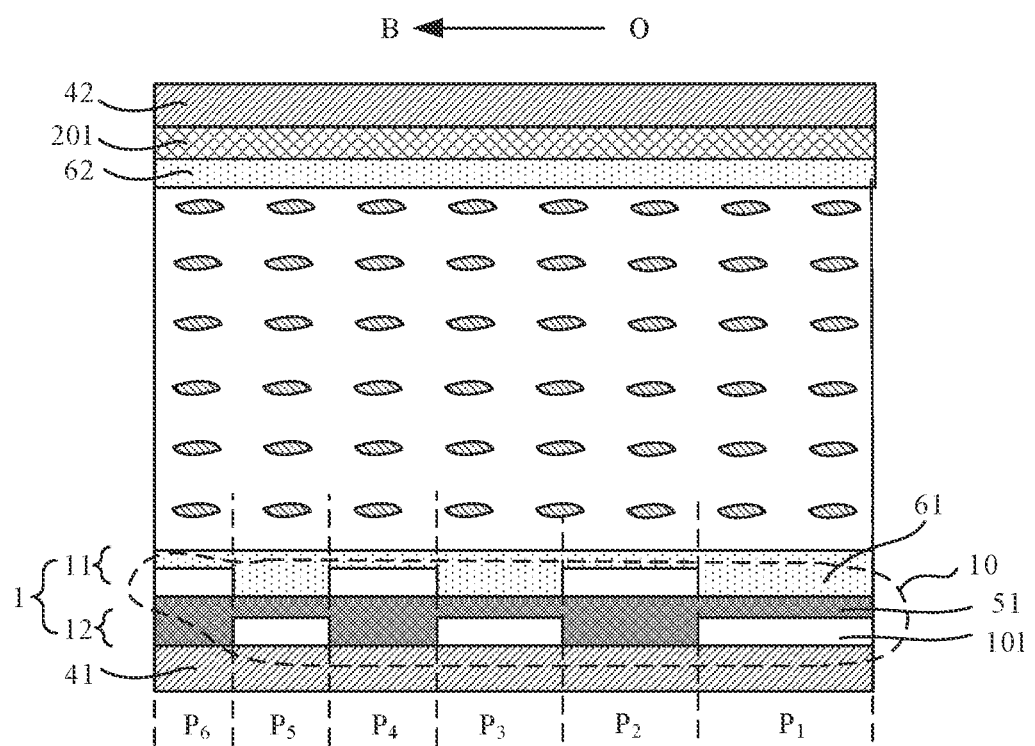
FIG. 16 is a schematic diagram showing a structure of a first electrode group of another liquid crystal lens, in accordance with some embodiments of the present disclosure.
Figure 17:
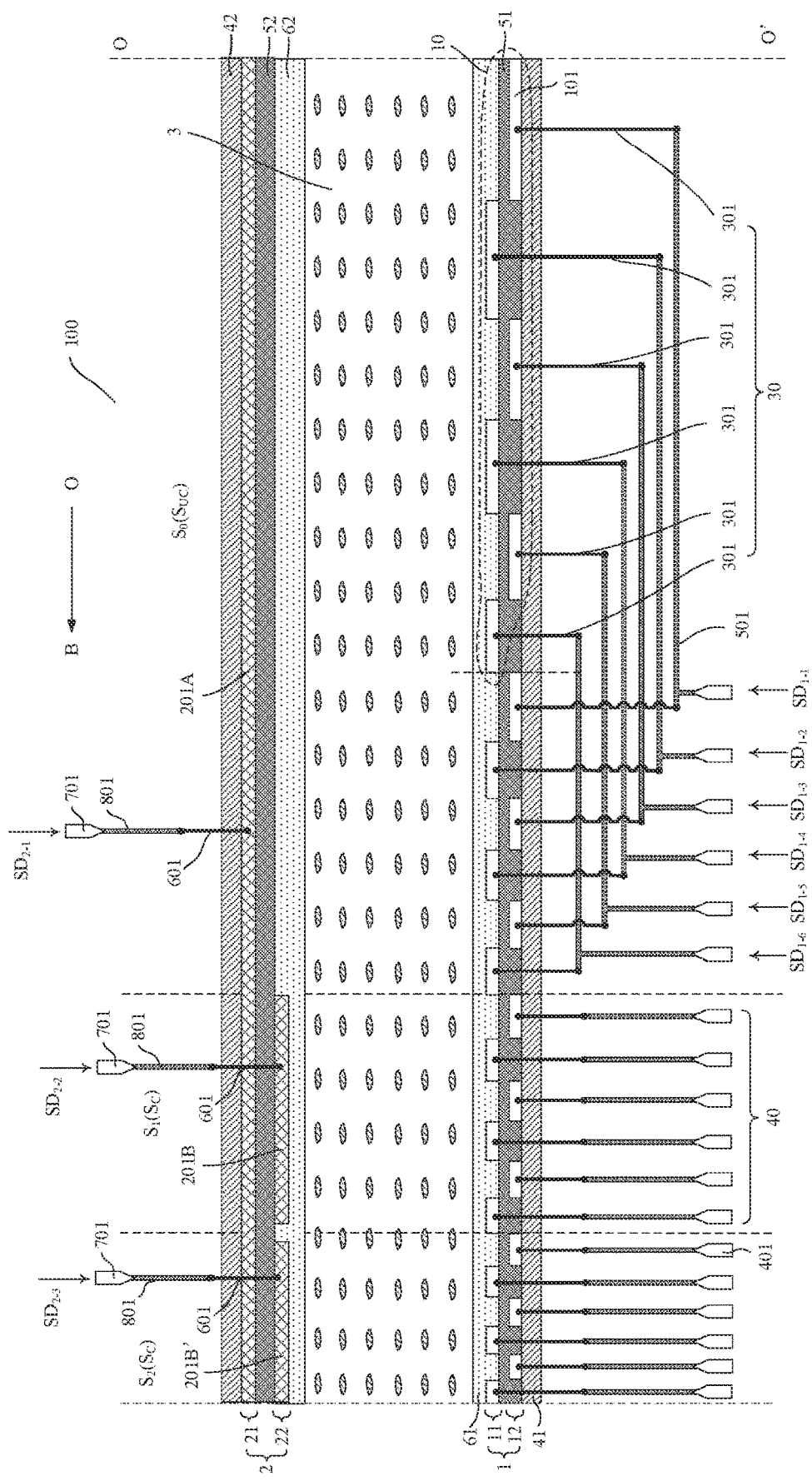
FIG. 17 is a schematic section showing a structure of yet another liquid crystal lens along the dashed line AA' in FIG. 4, in accordance with some embodiments of the present disclosure.

Hereinafter, the liquid crystal lens 100 will be described in an exemplary and overall manner with reference to FIGS. 5, 16 and 17.

The liquid crystal lens 100 has three driving regions $S_0$, $S_1$ and $S_2$. The driving region $S_0$ is a non-compensation driving region $S_{UC}$, the driving regions $S_1$ and $S_2$ are compensation driving regions $S_C$. The driving region $S_1$ is arranged around the driving region $S_0$, and the driving region $S_2$ is arranged around the driving region $S_1$.

The liquid crystal lens 100 includes the first base 41, the first electrode layer 1, a first orientation layer 61, the liquid crystal layer 3, a second orientation layer 62, the second electrode layer 2 and a second base 42 that are sequentially stacked.

The first electrode layer 1 includes the first sub-electrode layer 11 and the second sub-electrode layer 12, and the first sub-electrode layer is disposed on a side of the second sub-electrode layer 12 away from the first base 41. The liquid crystal lens 100 further includes the first insulating layer 51 disposed between the first sub-electrode layer 11 and the second sub-electrode layer 12.

The first electrode layer 1 includes a plurality of first electrode groups 10, each first electrode group includes six first electrodes 101, and any two adjacent first electrodes 101 in the first electrode layer 1 are disposed in different sub-electrode layers. Positions of the first electrodes 101 in each first electrode group 10 are sequentially numbered $P_1$, $P_2$, $P_3$, $P_4$, $P_5$ and $P_6$ in the direction OB.

The liquid crystal lens 100 further includes a plurality of first signal line groups 30 in one-to-one correspondence with the plurality of first electrode groups 10. Each first signal line group 30 includes six first signal lines 301, and six first electrodes 101 included in each first electrode group 10 are electrically connected to the six first signal lines 301 included in one first signal line group 30 in a one-to-one correspondence manner.

The liquid crystal lens 100 further includes three first connecting line groups 50, and three first signal receiving terminal groups 40 in one-to-one correspondence thereto. Each driving region of the liquid crystal lens 100 corresponds to one first connecting line group 50, and corresponds to one first signal receiving terminal group 40. Each first connecting line group 50 includes six first connecting lines 501, and each first signal receiving terminal group 40 includes six first signal receiving terminals 401. Each first signal receiving terminal group receives a group of first driving signals $SD_1$: $SD_{1-1}$, $SD_{1-2}$, $SD_{1-3}$, $SD_{1-4}$, $SD_{1-5}$ and $SD_{1-6}$.

In each driving region, the first signal line(s) 301 corresponding to the first electrode(s) 101 at the same position are electrically connected to the same first signal receiving terminal 401 through the same first connecting line 501. That is, the first electrode(s) 101 at the position $P_1$ are electrically connected to a first signal receiving terminal 401 receiving a first driving signal $SD_{1-1}$, the first electrode(s) 101 at the position $P_2$ are electrically connected to a first signal receiving terminal 401 receiving a first driving signal $SD_{1-2}$, the first electrode(s) 101 at the position $P_3$ are electrically connected to a first signal receiving terminal 401 receiving a first driving signal $SD_{1-3}$, the first electrode(s) 101 at the position $P_4$ are electrically connected to a first signal receiving terminal 401 receiving a first driving signal $SD_{1-4}$, the first electrode(s) 101 at the position $P_5$ are electrically connected to a first signal receiving terminal 401 receiving a first driving signal $SD_{1-5}$, and the first electrode(s) 101 at the position $P_6$ are electrically connected to a first signal receiving terminal 401 receiving a first driving signal $SD_{1-6}$.

Herein, voltage values of the first driving signals $SD_{1-1}$, $SD_{1-2}$, $SD_{1-3}$, $SD_{1-4}$, $SD_{1-5}$ and $SD_{1-6}$ increase or decrease progressively. For example, if the liquid crystal lens 100 simulates optical characteristics of a convex lens, the voltage values of the first driving signals $SD_{1-1}$, $SD_{1-2}$, $SD_{1-3}$, $SD_{1-4}$, $SD_{1-5}$ and $SD_{1-6}$ increase progressively; for example, if the liquid crystal lens 100 simulates optical characteristics of a concave lens, the voltage values of the first driving signals $SD_{1-1}$, $SD_{1-2}$, $SD_{1-3}$, $SD_{1-4}$, $SD_{1-5}$ and $SD_{1-6}$ decrease progressively.

The second electrode layer 2 includes the third sub-electrode layer 21 and the fourth sub-electrode layer 22, and the third sub-electrode layer 21 is disposed on a side of the fourth sub-electrode layer 22 away from the first base 41. The liquid crystal lens 100 further includes a second insulating layer 52 disposed between the third sub-electrode layer 21 and the fourth sub-electrode layer 22.

The second electrode layer 2 includes three second electrodes 201: 201A, 201B and 201B'. The second electrode 201A is a circular electrode, and both the second electrode 201B and the second electrode 201B' are annular electrodes. The second electrode 201A covers the three driving regions $S_0$, $S_1$ and $S_2$ of the liquid crystal lens 100. The second electrode 201B' is arranged around the second electrode 201B, the second electrode 201B corresponds to the driving region $S_1$, and the second electrode 201B' corresponds to the driving region $S_2$.

The liquid crystal lens 100 further includes: three second signal lines 601, three second connecting lines 801, and three second signal receiving terminals 701. Each second electrode 201 is electrically connected to one second signal line 601, each second signal line 601 is electrically connected to one second signal receiving terminal 701 through one second connecting line 801, and each second signal receiving terminal 701 receives a second driving signal $SD_2$. The second signal receiving terminals 701 corresponding to the second electrode 201A, the second electrode 201B and the second electrode 201B' sequentially receive the second driving signals $SD_{2-1}$, $SD_{2-2}$ and $SD_{2-3}$. Voltage values of the second driving signals $SD_{2-1}$, $SD_{2-2}$ and $SD_{2-3}$ increase progressively and sequentially.

Figure 18:
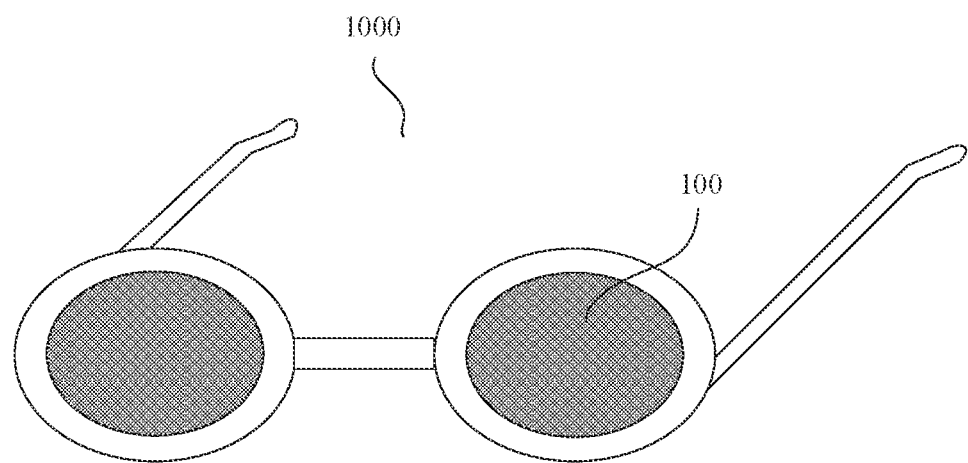
FIG. 18 is a schematic diagram showing a structure of liquid crystal glasses, in accordance with some embodiments of the present disclosure.

Referring to FIG. 18, some embodiments of the present disclosure further provide liquid crystal glasses 1000, and the liquid crystal glasses 1000 includes the liquid crystal lens 100 as described in any of the above embodiments.

The lens of the liquid crystal glasses 1000 has a same structure as the liquid crystal lens 100 as described above, and also have advantages of images displayed at the edge being clear and a large FOV. Since the beneficial effects of the liquid crystal lens 100 have been described in detail in the above embodiments, which will not be described herein again.

Some embodiments of the present disclosure further provide a method for controlling a liquid crystal lens, which is applied to the liquid crystal lens 100 as described in any of the above embodiments, and the method for controlling the liquid crystal lens includes the following steps.

First driving signals $SD_1$ are transmitted to the plurality of first electrodes 101 of each first electrode group 10 in the first electrode layer 1 of the liquid crystal lens 100 respectively, and second driving signals $SD_2$ are transmitted to each second electrode 201 in the second electrode layer 2 of the liquid crystal lens 100, so that a driving voltage is formed between each first electrode 101 and a second electrode 201 corresponding to the first electrode 101.

With respect to a same driving region of the liquid crystal lens 100, driving voltage(s) formed between the first driving signal(s) SD1 received by the first electrode(s) 101 at the same position in the first electrode group(s) 10 and the second driving signal(s) $SD_2$ received by the corresponding second electrode(s) 201 are equal.

With respect to different driving regions of the liquid crystal lens 100, a driving voltage formed between the first driving signal(s) $SD_1$ received by the first electrode(s) 101 at the same position in the first electrode group(s) 10 and the second driving signal(s) $SD_2$ received by the corresponding second electrode(s) 201 in one driving region is different from a driving voltage formed between first driving signal(s) received by first electrode(s) at the same position in first electrode group(s) and second driving signal(s) received by corresponding second electrode(s) in another driving region, and the driving voltages progressively increase in the radial direction of the liquid crystal lens 100 and in the direction OB from the center O to the edge B of the liquid crystal lens 100, and phase differences of the liquid crystal lens 100 in the driving regions are equal or approximately equal.

Thus, compared with the driving voltage formed by the first electrode 101 at a certain position at the center of the liquid crystal lens 100 and a corresponding second electrode 2, the driving voltage formed by the first electrode 101 at the same position at the edge and corresponding second electrode(s) 2 increases. In this way, the increased driving voltage at the edge further makes the liquid crystal molecules (which could not reach the expected deflection angle due to the influence of the interference electric field) rotate further, and the deflection angles become larger, so that the deflection angles of the liquid crystal molecules at the edge are close to or even reach the required deflection angle, and the refractive index of the edge of the liquid crystal lens 100 can also reach the required refractive index to make the image displayed at the edge clear, and the FOV of the liquid crystal lens 100 increases.

On this basis, in some embodiments, referring to FIG. 5, the step of transmitting the first driving signals $SD_1$ to the plurality of first electrodes 101 of each first electrode group 10 in the first electrode layer 1 of the liquid crystal lens 100 respectively includes:

in the same driving region, transmitting a same first driving signal $SD_1$ to the first electrode(s) 101 at the same position in the first electrode group(s) 10 corresponding to the driving region; and in different driving regions, transmitting different first driving signals $SD_1$ to first electrodes 101 at the same position in the first electrode groups 10 corresponding to different driving regions respectively, and voltage values of the first driving signals increase progressively and sequentially in the radial direction of the liquid crystal lens 100 and in the direction OB from the center O to the edge B of the liquid crystal lens 100.

The step of transmitting a second driving signal to each second electrode 201 in the second electrode layer 2 of the liquid crystal lens 100 includes: transmitting a same second driving signal $SD_2$ to each second electrode 201 in the second electrode layer 2.

For example, referring to FIGS. 15 and 16, the method for controlling the liquid crystal lens described above will be illustrated exemplarily below by taking an example in which the second driving signal $SD_2$ transmitted to the second electrode 201 of the liquid crystal lens 100 is 0 V.

Herein, each first electrode group 10 of the liquid crystal lens 100 includes six first electrodes 101, and the positions of the first electrodes 101 in the first electrode group 10 are respectively numbered $P_1$, $P_2$, $P_3$, $P_4$, $P_5$ and $P_6$ in the direction OB. The liquid crystal lens 100 has the driving regions $S_0$, $S_1$ and $S_2$ that are sequentially arranged in the direction OB.

In different driving regions, the voltages of the first driving signals $SD_1$ (including the first driving signals $SD_{1-1}$ to $SD_{1-6}$) transmitted to the six first electrodes 101 included in each first electrode group 10 are shown in Table 1.

Herein, the first electrode 101 at the position $P_1$ receives the first driving signal $SD_{1-1}$, the first electrode 101 at the position $P_2$ receives the first driving signal $SD_{1-2}$, the first electrode 101 at the position $P_3$ receives the first driving signal $SD_{1-3}$, the first electrode 101 at the position $P_4$ receives the first driving signal $SD_{1-4}$, the first electrode 101 at the position $P_5$ receives the first driving signal $SD_1$-s, and the first electrode 101 at the position $P_6$ receives the first driving signal $SD_{1-6}$.

TABLE 1

| Signals | Driving regions | | |
| --- | --- | --- | --- |
|  | $S_1$ | $S_2$ | $S_3$ |
| $SD_{1-1}$ | 0 V | 0 V | 0 V |
| $SD_{1-2}$ | 1.35 V | 2.06 V | 2.774 V |
| $SD_{1-3}$ | 2.1 V | 2.49 V | 3.524 V |
| $SD_{1-4}$ | 2.84 V | 2.9 V | 4.264 V |
| $SD_{1-5}$ | 3.28 V | 3.58 V | 5.004 V |
| $SD_{1-6}$ | 3.85 V | 4.33 V | 5.754 V |

As will be seen from Table 1, in the same driving region, for example, in the driving region $S_0$, voltage values of the first driving signals $SD_1$ received by the first electrodes 101 at different positions in each first electrode group 10 increase progressively in the direction OB. That is, in the direction OB, the voltages of the first electrodes 101 in the same first electrode group 10 increase progressively and sequentially, and in the driving regions $S_1$ and $S_2$, the voltages of the first electrodes 101 in the same first electrode group 10 also have such a variation.

Herein, it will be noted that, the voltage value(s) of the first electrode(s) 101 at the same position in the first electrode group(s) 10 in the same driving region are equal or approximately equal. For example, in the driving region $S_0$, the voltage values of the first electrodes 101 at the position $P_1$ in the first electrode groups 10 are equal or approximately equal.

Figure 15:
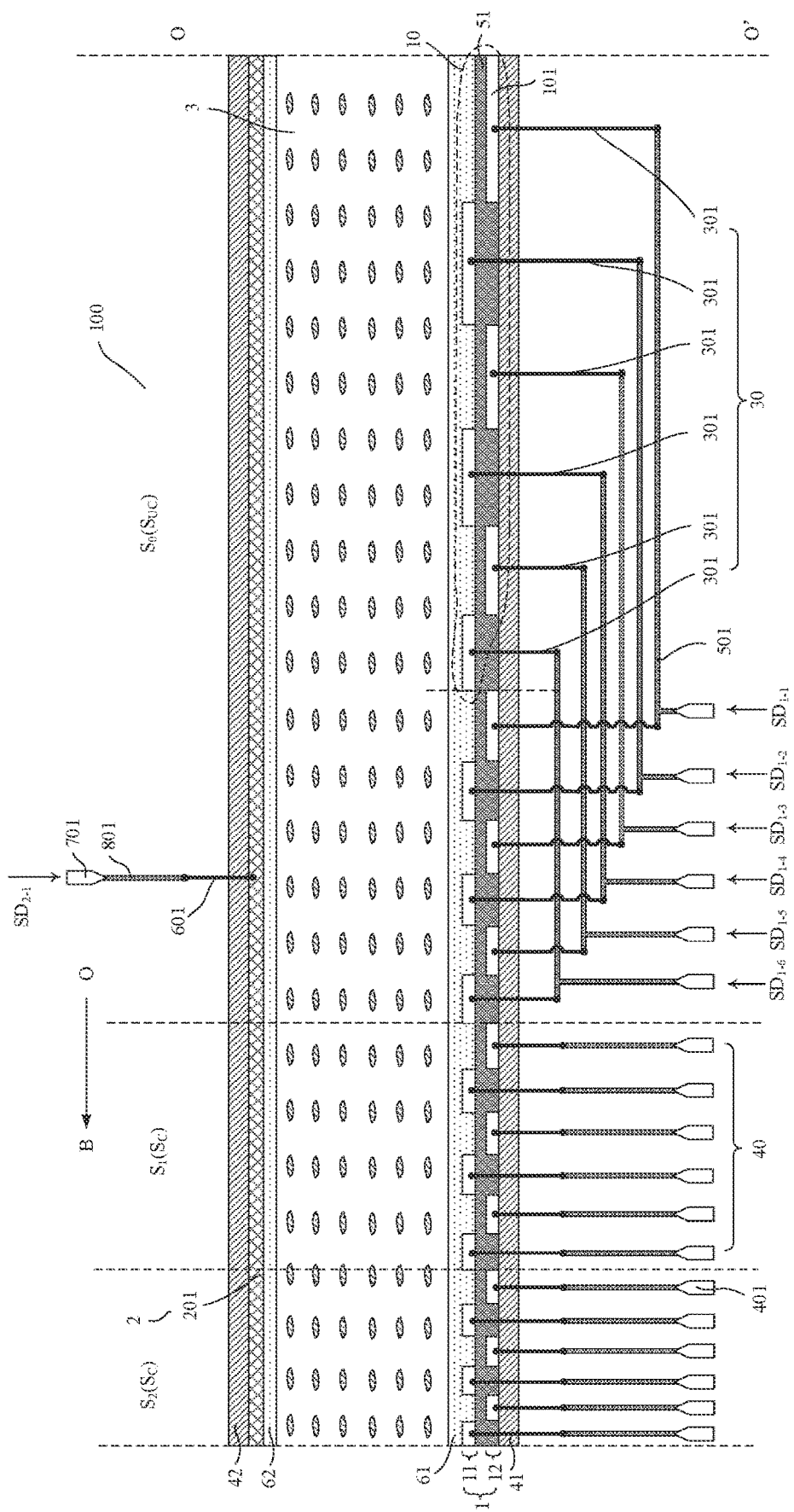
FIG. 15 is a schematic section showing a structure of yet another liquid crystal lens along the dashed line AA' in FIG. 4, in accordance with some embodiments of the present disclosure.

As shown in FIG. 15, in the direction OB, in different driving regions, the voltage values of the first driving signals $SD_1$ transmitted to the first electrodes 101 at the same position increase progressively and sequentially. The first electrodes 101 at the position $P_3$ are taken as an example, the first driving signals $SD_{1-3}$ transmitted to the first electrodes 101 at the position $P_3$ in the driving regions $S_0$, $S_1$ and $S_2$ are 2.1 V, 2.49 V and 3.524 V, respectively. That is, in the direction OB, the voltage values of the first electrodes 101 at the position $P_3$ in different driving regions increase progressively. In this way, the absolute values of the driving voltages formed by the first electrodes 101 at the position $P_3$ in the driving regions $S_0$, $S_1$ and $S_2$ and the second electrode 201 are 2.1 V, 2.49 V and 3.524 V, respectively. That is, in the direction OB, the absolute values of the driving voltages formed by the first electrodes 101 at the same position in different driving regions and the second electrode 201 increase progressively.

It will be noted that, the driving voltages formed by the first electrodes 101 at the position $P_1$ in different driving regions and the second electrode(s) 201 are 0 V. That is, in a region of the liquid crystal layer 3 corresponding to each first electrode 101 at the position $P_1$, the liquid crystal molecules need to be in an undriven state. In this case, the liquid crystal molecules are parallel or substantially parallel to the first substrate 41, and the long axises of the liquid crystal molecules are parallel or substantially parallel to an electric field direction of the interference electric field. Therefore, the interference electric field does not affect the deflection angles of the liquid crystal molecules in the region. In another example, it is also possible that the first driving signals $SD_{1-1}$, the voltage values of which progressively increase, are transmitted to the first electrodes 101 at the position $P_1$ in different driving regions, respectively.

In the embodiments described above, the FOV of the liquid crystal lens 100 can reach −31.5° to +31.5°, and the FOV is effectively increased.

In some embodiments, referring to FIGS. 7 and 9, the second electrode layer 2 includes at least two second electrodes 201 in one-to-one correspondence with the at least two driving regions.

The step of transmitting the first driving signals $SD_1$ to the plurality of first electrodes 101 of each first electrode group 10 in the first electrode layer 1 of the liquid crystal lens 100 includes: transmitting a same first driving signal $SD_1$ to the first electrodes 101 at the same position in the first electrode groups 10 in the at least two driving regions of the liquid crystal lens 100.

The step of transmitting a second driving signal $SD_2$ to each second electrode 201 in the second electrode layer 2 of the liquid crystal lens 100 includes: transmitting different second driving signals $SD_2$ to the second electrodes 201 corresponding to different driving regions respectively, and voltage values of the second driving signals are increased or decreased progressively and sequentially in the radial direction of the liquid crystal lens 100 and in the direction OB from the center O to the edge B of the liquid crystal lens 100. For example, the second driving signals $SD_2$ include $SD_{2\text{-}1}$, $SD_{2\text{-}2}$ and $SD_{2\text{-}3}$, and in the OB direction, the second electrodes 201 sequentially receive the second driving signals $SD_{2\text{-}1}$, $SD_{2\text{-}2}$ and $SD_{2\text{-}3}$. In this case, a voltage value of the second driving signal $SD_{2\text{-}1}$ is less than a voltage value of the second driving signal $SD_{2\text{-}2}$, and the voltage value of the second driving signal $SD_{2\text{-}2}$ is less than a voltage value of the second driving signal $SD_{2\text{-}3}$.

For example, in a case where the voltage value of the second driving signal $SD_2$ transmitted to the second electrode 201 is less than or equal to the voltage value of the first driving signal $SD_1$, the second driving signals $SD_2$, the voltage values of which progressively decrease, are respectively transmitted to the second electrodes 201 corresponding to different driving regions in the direction OB.

The liquid crystal lens 100 shown in FIG. 7 or 9 is taken as an example, the first driving signals $SD_1$ (including the first driving signals $SD_{1\text{-}1}$ to $SD_{1\text{-}3}$) transmitted to the first electrode 101 at the position $P_1$, the first electrode 101 at the position $P_2$ and the first electrode 101 at the position $P_3$ in each first electrode group 10 in all driving regions are 0 V, 2.5 V and 5 V, respectively. In the direction OB, the second driving signals $SD_2$ (including the second driving signals $SD_{2\text{-}1}$ to $SD_{2\text{-}3}$) transmitted to the second electrodes 201 corresponding to different driving regions are 0 V, -1 V and -2 V, respectively.

In this way, in the direction OB, the absolute values of the driving voltages formed between the first electrodes 101 at the position $P_1$ in different driving regions and the corresponding second electrodes 201 are 0 V, 1 V and 2 V, respectively; the absolute values of the driving voltages formed between the first electrodes 101 at the position $P_2$ and the corresponding second electrodes 201 are 2.5 V, 3.5 V and 4.5 V, respectively; and the absolute values of the driving voltages formed between the first electrodes 101 at the position $P_3$ and the corresponding second electrodes 201 are 5 V, 6 V and 7 V, respectively. That is, in the direction OB, the absolute values of the driving voltages formed between the first driving signals $SD_1$ received by the first electrodes 101 at the same position in different driving regions and the second driving signals $SD_2$ received by the corresponding second electrodes 201 increase progressively.

For example, in a case where the voltage value of the second driving signal $SD_2$ transmitted to the second electrode 201 is greater than or equal to the voltage value of the first driving signal $SD_1$, the second driving signals $SD_2$, the voltage values of which progressively increase, are respectively transmitted to the second electrodes 201 corresponding to different driving regions in the direction OB.

The liquid crystal lens 100 shown in FIG. 7 or 9 is taken as an example, the first driving signals $SD_1$ (including the first driving signals $SD_{1\text{-}1}$ to $SD_{1\text{-}3}$) transmitted to the first electrode 101 at the position $P_1$, the first electrode 101 at the position $P_2$ and the first electrode 101 at the position $P_3$ in each first electrode group 10 in all driving regions are 0 V, -2.5 V and -5 V, respectively. In the direction OB, the second driving signals $SD_2$ (including the second driving signals $SD_{2\text{-}1}$ to $SD_{2\text{-}3}$) transmitted to the second electrodes 201 corresponding to different driving regions are 0 V, 1 V and 2 V, respectively.

In this way, in the direction OB, the absolute values of the driving voltages formed between the first electrodes 101 at the position $P_1$ in different driving regions and the corresponding second electrodes 201 are 0 V, 1 V and 2 V, respectively; the absolute values of the driving voltages formed between the first electrodes 101 at the position $P_2$ in different driving regions and the corresponding second electrodes 201 are 2.5 V, 3.5 V and 4.5 V, respectively; and the absolute values of the driving voltages formed between the first electrodes 101 at the position $P_3$ in different driving regions and the corresponding second electrodes 201 are 5 V, 6 V and 7 V, respectively. That is, in the direction OB, the absolute values of the driving voltages formed between the first driving signals $SD_1$ received by the first electrodes 101 at the same position in different driving regions and the second driving signals $SD_2$ received by the corresponding second electrodes 201 increase progressively.

In some embodiments, referring to FIGS. 12 to 14, the second electrode layer 2 includes a circular electrode 201A or a whole electrode, and at least one annular electrode 201B.

The step of transmitting the first driving signals $SD_1$ to the plurality of first electrodes 101 of each first electrode group 10 in the first electrode layer 1 of the liquid crystal lens 100 respectively includes: transmitting the same first driving signal $SD_1$ to the first electrodes 101 at the same position in the first electrode groups 10 in the at least two driving regions of the liquid crystal lens 100.

The step of transmitting the second driving signals $SD_2$ to the second electrodes 201 in the second electrode layer 2 of the liquid crystal lens 100 respectively includes: transmitting different second driving signals $SD_2$ to different annular electrodes 201B, and voltage values of the second driving signals are increased or decreased progressively and sequentially in the radial direction of the liquid crystal lens 100 and in the direction OB from the center O to the edge B of the liquid crystal lens 100.

For example, the second driving signal $SD_{2\text{-}1}$ with a voltage value of 0 V is transmitted to the circular electrode 201A, the first driving signals $SD_1$ with positive voltages are transmitted to the first electrodes 101, and voltage values of the second driving signals $SD_2$ (including the second driving signals $SD_{2\text{-}2}$ and $SD_{2\text{-}3}$) transmitted to the annular electrodes 201B are each in a range from -1 V to -5 V.

In some embodiments, in a case where the voltage value of the second driving signal $SD_2$ transmitted to the second electrode 201 is less than or equal to the voltage value of the first driving signal $SD_1$, the second driving signals $SD_2$, the voltage values of which progressively decrease, are respectively transmitted to the annular electrode(s) 201B in the direction OB.

The method for controlling the liquid crystal lens described above will be illustrated exemplarily below with reference to FIGS. 4 and 17.

The second electrode layer 2 of the liquid crystal lens includes one circular electrode 201A, and the liquid crystal lens 100 has the driving regions $S_0$, $S_1$ and $S_2$ that are sequentially arranged in the direction OB. The driving region $S_0$ is a non-compensation driving region $S_{UC}$, the driving region $S_1$ is a compensation driving region $S_C$, and the driving region $S_2$ is a compensation driving region $S_C$. The circular electrode 201A corresponds to the driving region $S_0$, the annular electrode 201B corresponds to the driving region $S_1$, and the annular electrode 201B' corresponds to the driving region $S_2$.

In the driving regions $S_0$, $S_1$ and $S_2$, the first driving signals $SD_1$ (including the first driving signals $SD_{1\text{-}1}$ to $SD_{1\text{-}6}$) received by the first electrode 101 at the position $P_1$, the first electrode 101 at the position $P_2$, the first electrode 101 at the position $P_3$, the first electrode 101 at the position $P_4$, the first electrode 101 at the position $P_3$ and the first electrode 101 at the position $P_6$ in each first electrode group 10 are 0 V, 1 V, 2 V, 3 V, 4 V and 5 V, respectively.

The second driving signal $SD_{2-1}$ transmitted to the circular electrode 201A is 0 V, the second driving signal $SD_{2-2}$ transmitted to the annular electrode 201B is −1 V, and the second driving signal $SD_{2-3}$ transmitted to the annular electrode 201B' is −2 V.

It will be noted that, with respect to each driving region, a voltage value of the second electrode layer 2 should be a sum of the voltage values of the second driving signals $SD_2$ received by all the second electrodes 201 corresponding to the driving region.

In this way, in the direction OB, in different driving regions, the absolute values of the driving voltages formed between the first electrodes 101 at the position $P_1$ and the corresponding second electrodes 201 are 0 V, 1 V and 2 V, respectively; the absolute values of the driving voltages formed between the first electrodes 101 at the position $P_2$ and the corresponding second electrodes 201 are 1 V, 2 V and 3 V, respectively; the absolute values of the driving voltages formed between the first electrodes 101 at the position $P_3$ and the corresponding second electrodes 201 are 2 V, 3 V and 4 V, respectively; the absolute values of the driving voltages formed between the first electrodes 101 at the position $P_4$ and the corresponding second electrodes 201 are 3 V, 4 V and 5 V, respectively; the absolute values of the driving voltages formed between the first electrodes 101 at the position $P_5$ and the corresponding second electrodes 201 are 4 V, 5 V and 6 V, respectively; and the absolute values of the driving voltages formed between the first electrodes 101 at the position $P_6$ and the corresponding second electrodes 201 are 5 V, 6 V and 7 V, respectively. That is, in the direction OB, the absolute values of the driving voltages formed between the first driving signals $SD_1$ received by the first electrodes 101 at the same position in different driving regions and the second driving signals $SD_2$ received by corresponding second electrodes 201 increase progressively.

In some other embodiments, in a case where the voltage value of the second driving signal $SD_2$ transmitted to the second electrode 201 is greater than or equal to the voltage value of the first driving signal $SD_1$, the second driving signals $SD_2$, the voltage values of which progressively increase, are respectively transmitted to the annular electrode(s) in the direction OB.

The method for controlling the liquid crystal lens described above will be illustrated exemplarily below with continued reference to FIGS. 4 and 17.

It will be noted that, a correspondence between each second electrode 201 and each driving region, and the first driving signals $SD_1$ received by the first electrodes 101 at different positions of the first electrode groups 10 in each driving region, are the same as which in the case where the voltage value of the second driving signal $SD_2$ is less than or equal to the voltage value of the first driving signal $SD_1$ as described above, which will not be repeated herein.

The second driving signal $SD_{2-1}$ transmitted to the circular electrode 201A is 5 V, the second driving signal $SD_{2-2}$ transmitted to the annular electrode 201B is 1 V, and the second driving signal $SD_{2-3}$ transmitted to the annular electrode 201B' is 2 V. It will be noted that, with respect to each driving region, the voltage value of the second electrode layer 2 should be a sum of the voltage values of the second driving signals $SD_2$ received by all the second electrodes 201 corresponding to the driving region.

In this way, in the direction OB, in different driving regions, the absolute values of the driving voltages formed between the first electrodes 101 at the position $P_1$ and the corresponding second electrodes 201 are 5 V, 6 V and 7 V, respectively; the absolute values of the driving voltages formed between the first electrodes 101 at the position $P_2$ and the corresponding second electrodes 201 are 4 V, 5 V and 6 V, respectively; the absolute values of the driving voltages formed between the first electrodes 101 at the position $P_3$ and the corresponding second electrodes 201 are 3 V, 4 V and 5V, respectively; the absolute values of the driving voltages formed between the first electrodes 101 at the position $P_4$ and the corresponding second electrodes 201 are 2 V, 3 V and 4 V, respectively; the absolute values of the driving voltages formed between the first electrodes 101 at the position $P_5$ and the corresponding second electrodes 201 are 1 V, 2 V and 3 V, respectively; and the absolute values of the driving voltages formed between the first electrodes 101 at the position $P_6$ and the corresponding second electrodes 201 are 0 V, 1 V and 2 V, respectively. That is, in the direction OB, the absolute values of the driving voltages formed between the first driving signals $SD_1$ received by the first electrodes 101 at the same position in different driving regions and the second driving signals $SD_2$ received by corresponding second electrodes 201 increase progressively.

Some embodiments of the present disclosure also provide a non-transitory computer-readable storage medium in which a computer program instruction is stored. When the computer program instruction runs in a processor, the processor executes the method for controlling the liquid crystal lens as described in any of the above embodiments.

The non-transitory computer-readable storage medium also has the effect of increasing the FOV of the liquid crystal lens as the method for controlling the liquid crystal lens described above, which will not be repeated herein.

Some embodiments of the present disclosure also provide a computer program product including a computer program instruction. When it runs in a computer, the computer executes the method for controlling the liquid crystal lens as described in any of the above embodiments.

Some embodiments of the present disclosure also provide a computer program. When the computer program is loaded into a processor, the processor executes the method for controlling the liquid crystal lens as described in any of the above embodiments.

The foregoing descriptions are merely specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A liquid crystal lens having at least two driving regions, the liquid crystal lens comprising:
   a first electrode layer including a plurality of first electrode groups, and each first electrode group including a plurality of first electrodes; wherein the plurality of first electrodes included in each first electrode group are configured to receive a plurality of first driving signals in a one-to-one correspondence manner, and each driving region corresponds to at least one first electrode group; and
   a second electrode layer disposed opposite to the first electrode layer, and the second electrode layer including at least one second electrode; wherein the at least one second electrode is configured to receive at least one second driving signal in a one-to-one correspondence manner; wherein in a same driving region, a driving voltage formed between each first driving signal received by at least one first electrode at a same position in the at least one first electrode group and at least one second driving s received by at least one second electrode corresponding thereto is equal or approximately equal; and in different driving regions, a driving voltage formed between each first driving signal received by at least one first electrode at a same position in the at least one first electrode group and at least one second driving signal received by at least one second electrode corresponding thereto in one driving region is different from a driving voltage formed between each first driving signal received by at least one first electrode at the same position in the at least one first electrode group and at least one second driving signal received by at least one second electrode corresponding thereto in another driving region, and absolute values of driving voltages progressively increase in a radial direction of the liquid crystal lens and in a direction from a center to an edge of the liquid crystal lens.

2. The liquid crystal lens according to claim 1, further comprising:

a plurality of first signal line groups in one-to-one correspondence with the plurality of first electrode groups, wherein each first signal line group includes a plurality of first signal lines, and the plurality of first signal lines included in each first signal line group are electrically connected to the plurality of first electrodes included in a corresponding first electrode group in a one-to-one correspondence manner; and each first signal line is configured to transmit a first driving signal to a first electrode electrically connected thereto; and at least one second signal line electrically connected to the at least one second electrode in a one-to-one correspondence manner, wherein each second signal line is configured to transmit a second driving signal to a second electrode electrically connected thereto.

3. The liquid crystal lens according to claim 2, further comprising at least two first signal receiving terminal groups in one-to-one correspondence with the at least two driving regions, wherein each first signal receiving terminal group includes a plurality of first signal receiving terminals; and in each driving region, the plurality of first signal lines included in each first signal line group are correspondingly electrically connected to the plurality of first signal receiving terminals included in a corresponding first signal receiving terminal group, respectively, and at least one first signal line electrically connected to the at least one first electrode at the same position in the at least one first electrode group is electrically connected to a same first signal receiving terminal.

4. The liquid crystal lens according to claim 3, further comprising at least two first connecting line groups in one-to-one correspondence with the at least two first signal receiving terminal groups, wherein each first connecting line group includes a plurality of first connecting lines; and in each driving region, the plurality of first signal lines included in each first signal line group are electrically connected to the plurality of first signal receiving terminals included in a corresponding first signal receiving terminal group through the plurality of first connecting lines included in a corresponding first connecting line group, respectively, and the at least one first signal line electrically connected to the at least one first electrode at the same position in the at least one first electrode group is electrically connected to the same first signal receiving terminal through a same first connecting line.

5. The liquid crystal lens according to claim 2, further comprising at least one second signal receiving terminal electrically connected to the at least one second signal line in a one-to-one correspondence manner.

6. The liquid crystal lens according to claim 5, further comprising at least one second connecting line electrically connected to the at least one second signal receiving terminal in a one-to-one correspondence manner, wherein each second signal line is electrically connected to a corresponding second signal receiving terminal through one second connecting line.

7. The liquid crystal lens according to claim 1, wherein the at least two driving regions include a non-compensation driving region and at least one compensation driving region, and the at least one compensation driving region is sequentially arranged around the non-compensation driving region in the radial direction of the liquid crystal lens and in the direction from a center to an edge of the liquid crystal lens;

a width of each first electrode included in each first electrode group in the compensation driving region is less than a preset dimension, and a width of each first electrode included in each first electrode group in the non-compensation driving region is greater than or equal to the preset dimension; and the preset dimension is related to a width of a first electrode corresponding to a maximum critical value of an interference electric field within an acceptable range.

8. The liquid crystal lens according to claim 1, further comprising a first insulating layer, wherein the first electrode layer includes a first sub-electrode layer and a second sub-electrode layer that are disposed in a stack, and the first insulating layer is located between the first sub-electrode layer and the second sub-electrode layer; and in a plurality of first electrodes included in the plurality of first electrode groups, a part of all first electrodes are disposed in the first sub-electrode layer, and another part of all first electrodes are disposed in the second sub-electrode layer.

9. The liquid crystal lens according to claim 8, wherein in the radial direction of the liquid crystal lens and in the direction from the center to the edge of the liquid crystal lens, the plurality of first electrodes included in the plurality of first electrode groups are alternately disposed in the first sub-electrode layer and the second sub-electrode layer.

10. The liquid crystal lens according to claim 1, wherein the second electrode layer includes at least two second electrodes, the at least two second electrodes are disposed in a same layer, and two adjacent second electrodes are insulated from each other by a gap therebetween; and the at least two driving regions are in one-to-one correspondence with the at least two second electrodes.

11. The liquid crystal lens according to claim 1, further comprising a second insulating layer, wherein the second electrode layer includes a third sub-electrode layer and a fourth sub-electrode layer that are disposed in a stack, and the second insulating layer is located between the third sub-electrode layer and the fourth sub-electrode layer; and the second electrode layer includes at least two second electrodes, at least one second electrode is disposed in the third sub-electrode layer, and at least one remaining second electrode is disposed in the fourth sub-electrode layer.

12. The liquid crystal lens according to claim 11, wherein in the radial direction of the liquid crystal lens and in the direction from the center to the edge of the liquid crystal lens, the at least two second electrodes included in the second electrode layer are alternately disposed in the third sub-electrode layer and the fourth sub-electrode layer.

13. The liquid crystal lens according to claim 11, wherein in the at least two second electrodes included in the second electrode layer, one second electrode is a circular electrode or a whole electrode, and at least one remaining second electrode is an annular electrode; and the circular electrode or the whole electrode is disposed in one of the third sub-electrode layer and the fourth sub-electrode layer, and the at least one annular electrode is disposed in another of the third sub-electrode layer and the fourth sub-electrode layer.

14. The liquid crystal lens according to claim 13, wherein the at least two driving regions include a non-compensation driving region and at least one compensation driving region, and the at least one compensation driving region is sequentially arranged around the non-compensation driving region in the radial direction of the liquid crystal lens and in the direction from a center to an edge of the liquid crystal lens; and each annular electrode corresponds to one compensation driving region; the second electrode layer includes a circular electrode, and the circular electrode corresponds to the non-compensation driving region.

15. Liquid crystal glasses, comprising the liquid crystal lens according to claim 1.

16. A method for controlling a liquid crystal lens, the method being applied to the liquid crystal lens according to claim 1, wherein the method comprises:

transmitting first driving signals to the plurality of first electrodes of each first electrode group in the first electrode layer of the liquid crystal lens respectively, and transmitting a second driving signal to each second electrode in the second electrode layer of the liquid crystal lens, so that a driving voltage is formed between each first electrode and at least one second electrode corresponding to the first electrode, wherein in the same driving region of the liquid crystal lens, a driving voltage formed between each first driving signal received by the at least one first electrode at the same position in the at least one first electrode group and the at least one second driving signal received by the at least one second electrode corresponding thereto is equal or approximately equal; and in different driving regions of the liquid crystal lens, a driving voltage formed between each first driving signal received by the at least one first electrode at the same position in the at least one first electrode group and the at least one second driving signal received by the at least one second electrode corresponding thereto in one driving region is different from a driving voltage formed between each first driving signal received by the at least one first electrode at the same position in the at least one first electrode group and the at least one second driving signal received by the at least one second electrode corresponding thereto in another driving region, and absolute values of the driving voltages progressively increase in the radial direction of the liquid crystal lens and in the direction from the center to the edge of the liquid crystal lens, so that phase differences of the liquid crystal lens in the driving regions are equal or approximately equal.

17. The method for controlling the liquid crystal lens according to claim 16, wherein the step of transmitting first driving signals to the plurality of first electrodes of each first electrode group in the first electrode layer of the liquid crystal lens respectively includes:

in the same driving region, transmitting a same first driving signal to the at least one first electrode at the same position in the at least one first electrode group corresponding to the driving region;

in different driving regions, transmitting different first driving signals to the first electrodes at the same position in the first electrode groups corresponding to different driving regions respectively, and voltage values of the first driving signals are increased or decreased progressively and sequentially in the radial direction of the liquid crystal lens and in the direction from the center to the edge of the liquid crystal lens; and the step of transmitting a second driving signal to each second electrode in the second electrode layer of the liquid crystal lens includes:

transmitting a same second driving signal to each second electrode in the second electrode layer.

18. The method for controlling the liquid crystal lens according to claim 16, wherein the second electrode layer includes at least two second electrodes in one-to-one correspondence with the at least two driving regions; and the step of transmitting first driving signals to the plurality of first electrodes of each first electrode group in the first electrode layer of the liquid crystal lens respectively includes:

transmitting a same first driving signal to the first electrodes at the same position in the first electrode groups in the at least two driving regions of the liquid crystal lens; and the step of transmitting a second driving signal to each second electrode in the second electrode layer of the liquid crystal lens respectively includes:

transmitting different second driving signals to second electrodes corresponding to different driving regions respectively, and voltage values of the second driving signals are increased or decreased progressively and sequentially in the radial direction of the liquid crystal lens and in the direction from the center to the edge of the liquid crystal lens.

19. The method for controlling the liquid crystal lens according to claim 16, wherein the second electrode layer includes a circular electrode or a whole electrode, and at least one annular electrode; and the step of transmitting first driving signals to the plurality of first electrodes of each first electrode group in the first electrode layer of the liquid crystal lens respectively includes:

transmitting a same first driving signal to the first electrodes at the same position in the first electrode groups in the at least two driving regions of the liquid crystal lens; and the step of transmitting a second driving signal to each second electrode in the second electrode layer of the liquid crystal lens respectively includes:

transmitting different second driving signals to different annular electrodes, and voltage values of the second driving signals are increased or decreased progressively and sequentially in the radial direction of the liquid crystal lens and in the direction from the center to the edge of the liquid crystal lens.

20. A non-transitory computer-readable storage medium, storing a computer program instruction therein, when the computer program instruction runs in a processor, the processor executes the method for controlling the liquid crystal lens according to claim 16.

\* \* \* \* \*